(12) United States Patent
Ohlsson

(10) Patent No.: US 7,235,607 B2
(45) Date of Patent: Jun. 26, 2007

(54) SHRINK FILM

(75) Inventor: Stefan Bertil Ohlsson, Wespelaar (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/642,949

(22) Filed: Aug. 18, 2003

(65) Prior Publication Data

US 2004/0053022 A1 Mar. 18, 2004

Related U.S. Application Data

(60) Provisional application No. 60/408,317, filed on Sep. 5, 2002.

(51) Int. Cl.
*C08L 23/04* (2006.01)
*C08L 23/08* (2006.01)
*B65B 53/00* (2006.01)
*B32B 1/00* (2006.01)
*B32B 27/08* (2006.01)

(52) U.S. Cl. .................. 525/191; 525/240; 428/34.9; 428/35.1; 428/36.91; 428/335; 428/461; 428/476.3; 428/500; 428/507; 428/515; 428/518; 428/523

(58) Field of Classification Search ............... 525/191, 525/202, 210, 211, 232, 240, 241; 428/34.9, 428/35.1, 36.91, 36.92, 335, 461, 475.3, 428/476.3, 500, 507, 515, 518, 523, 36
See application file for complete search history.

(56) References Cited

U.S. PATENT DOCUMENTS

| | | | |
|---|---|---|---|
| 4,243,619 A | 1/1981 | Fraser et al. | |
| 4,540,753 A | 9/1985 | Cozewith et al. | |
| 4,543,399 A | 9/1985 | Jenkins, III et al. | |
| 4,588,790 A | 5/1986 | Jenkins, III et al. | |
| 4,892,851 A | 1/1990 | Ewen et al. | |
| 5,026,798 A | 6/1991 | Canich | |
| 5,055,438 A | 10/1991 | Canich | |
| 5,057,475 A | 10/1991 | Canich et al. | |
| 5,153,157 A | 10/1992 | Hlatky et al. | |
| 5,206,075 A | 4/1993 | Hodgson, Jr. | |
| 5,241,025 A | 8/1993 | Hlatky et al. | |
| 5,264,405 A | 11/1993 | Canich | |
| 5,334,677 A | 8/1994 | Razavi et al. | |
| 5,350,723 A | 9/1994 | Neithamer et al. | |
| 5,352,749 A | 10/1994 | DeChellis et al. | |
| 5,405,922 A | 4/1995 | DeChellis et al. | |
| 5,416,228 A | 5/1995 | Ewen et al. | |
| 5,436,304 A | 7/1995 | Griffin et al. | |
| 5,449,651 A | 9/1995 | Reddy et al. | |
| 5,462,999 A | 10/1995 | Griffin et al. | |
| 5,569,693 A | 10/1996 | Doshi et al. | |
| 5,595,705 A | 1/1997 | Walton et al. | |
| 5,614,315 A | 3/1997 | Kondo et al. | |
| 5,674,945 A | 10/1997 | Takahashi et al. | |
| 5,763,543 A | 6/1998 | Muhle et al. | |
| 5,879,768 A | 3/1999 | Falla et al. | |
| 6,218,484 B1 | 4/2001 | Brown et al. | |
| 6,255,426 B1 | 7/2001 | Lue et al. | |
| 6,359,072 B1 * | 3/2002 | Whaley ............... | 525/191 |
| 6,423,420 B1 | 7/2002 | Brant et al. | |
| 6,482,532 B1 * | 11/2002 | Yap et al. ............ | 428/516 |
| 2004/0048019 A1 * | 3/2004 | Ohlsson ............... | 428/35.7 |

FOREIGN PATENT DOCUMENTS

| | | |
|---|---|---|
| CA | 2164919 | 6/1996 |
| CA | 2178459 | 12/1996 |
| EP | 277 044 | 8/1988 |
| EP | 426 638 | 5/1991 |
| EP | 427 697 | 5/1991 |
| EP | 495 375 | 7/1992 |
| EP | 500 944 | 9/1992 |
| EP | 520 732 | 12/1992 |
| EP | 570 982 | 11/1993 |
| EP | 600 425 | 6/1994 |
| EP | 612 768 | 8/1994 |
| EP | 707 957 | 4/1996 |
| JP | 10/119211 | 5/1998 |
| WO | WO 91/09882 | 7/1991 |
| WO | WO 93/03093 | 2/1993 |
| WO | WO 93/14132 | 7/1993 |
| WO | WO 94/03506 | 2/1994 |
| WO | WO 94/06857 | 3/1994 |
| WO | WO 96/02244 | 2/1996 |
| WO | WO 96/08520 | 3/1996 |
| WO | WO 97/22470 | 6/1997 |
| WO | WO 99/16799 | 4/1999 |
| WO | WO 01/98372 | 12/2001 |

(Continued)

OTHER PUBLICATIONS

L. Wild et al.; *"Determination of Branching Distributions in Polyethylene and Ethylene Copolymers,"* Journal of Polymer Science, vol. 20, pp. 441-455, 1982.

(Continued)

*Primary Examiner*—Nathan M. Nutter

(57) ABSTRACT

Heat-shrinkable monolayer and multilayer films are disclosed. The films are formed of a blend of a polyethylene copolymer having a CDBI of at least 70%, a melt index $I_{2.16}$ of from 0.1 to 15 g/10 min., a density of from 0.910 to 0.940 g/cm³, a melt index ratio $I_{21.6}/I_{2.16}$ of from 30 to 80, and an Mw/Mn ratio of from 2.5 to 5.5, and a second polymer, such as a low density polyethylene (LDPE). The heat-shrinkable films have a combination of improved optical and mechanical properties.

53 Claims, No Drawings

FOREIGN PATENT DOCUMENTS

| | | |
|---|---|---|
| WO | WO 02/48258 | 6/2002 |
| WO | WO 02/48258 A2 | 6/2002 |

OTHER PUBLICATIONS

G. Ver Strate et al.; "*Near Monodisperse Ethylene-Propylene Copolymers by Direct Ziegler-Natta Polymerization, Prepartion, Characterization, Properties*," Macromolecules, vol. 21, pp. 3360-3371, 1988.

Ouano, Augustus C.; "*Gel Permeation Chromatography*" Marcel Dekker, Inc., NY, vol. 6, pp. 287-368, 1975.

Rodriguez, F.; "*Principles of Polymer Systems 3rd ed.*," Hemisphere Pub Corp., NY, pp. 155-160, 1989.

Ewen, John A.; "*Syndiospecific Propylene Polymerizations with Group 4 Metallocenes*" J. Am. Chem. Soc. 110, pp. 6255-6256, 1988.

\* cited by examiner

SHRINK FILM

1. CROSS-REFERENCE TO RELATED APPLICATIONS

The present application claims the benefit of U.S. Provisional Application No. 60/408,317, filed Sep. 5, 2002, said application incorporated herein by reference.

2. FIELD OF THE INVENTION

The present invention is directed generally to polyethylene shrink films. In particular, the invention provides monolayer or multilayer shrink films including in at least one layer a metallocene-catalyzed polyethylene resin, and articles wrapped with such films.

3. BACKGROUND

Shrink films, also referred to as heat-shrinkable films, are widely used in both industrial and retail bundling and packaging applications. Such films are capable of shrinking upon application of heat to release stress imparted to the film during or subsequent to extrusion. The shrinkage can occur in one direction or in both longitudinal and transverse directions.

Industrial shrink films are commonly used for bundling articles on pallets. Typical industrial shrink films are formed in a single bubble blown extrusion process to a thickness of about 80 to 200 µm, and provide shrinkage in two directions, typically at a machine direction (MD) to transverse direction (TD) ratio of about 60:40. The main structural component of such industrial shrink films is typically high pressure, low density polyethylene (LDPE), often blended with up to about 30 weight percent of linear low density polyethylene (LLDPE) to reduce problems of hole formation during shrinkage. Typical LDPEs used have a melt index ($I_{2.16}$) of about 0.2 to 0.5, and typical LLDPEs used have a melt index of about 0.5 to 1.

Retail shrink films are commonly used for packaging and/or bundling articles for consumer use, such as, for example, in supermarket goods. Such films are typically formed in a single bubble blown extrusion process to a thickness of about 35 to 80 µm, with a typical MD:TD shrink ratio of about 80:20. Typical films are formed of LDPE/LLDPE blends, with the LDPE component having a melt index of about 0.5 to 1.

It has been difficult to obtain films combining good optical properties, such as clarity, haze and gloss, good shrink properties, and sufficient holding force, as well as good mechanical properties such as puncture resistance and tear strength. Monolayer films made predominantly of LDPE have poor optical properties, particularly when using a low melt index resin. Moreover, during shrinkage, the shrink force can be excessive, leading to ready formation of holes. In practice, such films need to be thicker than would be desired, to off-set such undesirable characteristics. Alternatively, small amounts of LLDPE can be added to improve optical and mechanical properties, but if more than about 30 wt. % LLDPE is used, the shrinkage becomes insufficient, and the processing requirements for film blowing become too demanding.

Another conventional approach to improving film properties of LDPE/LLDPE blends has been the development of double bubble equipment and processes to provide additional transverse direction stretch to the film. Such equipment forms the film in two successive bubbles, with an intermediate heating step between the two bubbles. In this way, higher amounts of LLDPE can be used while still maintaining adequate shrink properties. Unfortunately, such processes are complex and costly, and the specialized equipment requires a significant capital investment.

Thus, it would be desirable to have heat shrinkable films with a combination of good optical, mechanical and shrink properties, without resort to expensive and complex processing equipment.

4. SUMMARY OF THE INVENTION

In one embodiment, the invention provides a polymer blend including a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5; and a low density polyethylene (LDPE). The polymer blend is particularly suitable for use as a film resin for heat-shrinkable films.

In another embodiment, the invention provides a heat-shrinkable monolayer film formed of or including a blend of a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5; and a low density polyethylene (LDPE). The heat-shrinkable monolayer film has a clarity value of at least 10% and a puncture resistance damaging energy value of at least 40 mJ/µm.

In another embodiment, the invention provides a heat-shrinkable multilayer film. The multilayer film has at least one layer formed of or including a blend of a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5; and a low density polyethylene (LDPE). The multilayer heat-shrinkable film has a clarity value of at least 20% and a puncture resistance damaging energy value of at least 100 mJ/µm.

In any of these embodiments, the polymer blend can further include an additional polymer component, such as, for example, a high density polyethylene (HDPE).

In another embodiment, the invention provides a heat-shrinkable film having at least one layer of a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5. In this embodiment, the polyethylene copolymer is not blended with another polymer, except that minor amounts of conventional additives such as antioxidants, UV-stabilizers and processing aids can be used, some of which may be polymeric. In this embodiment, the film has a clarity value of at least 10% and a puncture resistance damaging energy value of at least 100 mJ/µm.

In another embodiment, the invention provides and article wrapped with any of the heat-shrinkable films of the invention.

In another embodiment, the invention provides a method of shrink-wrapping an article by providing an article, providing and of the heat-shrinkable films of the invention, wrapping the article with the film and applying heat to shrink the film.

5. DETAILED DESCRIPTION

5.1 Polyethylene Resins

Polyethylene resins suitable for the shrink films described herein are copolymers of ethylene and at least one comonomer. Polymers having more than two types of monomers, such as terpolymers, are also included within the term "copolymer" as used herein. As used herein, the term "ethylene copolymer" indicates a polymer formed of more than 50 mol % polymerized ethylene units, and the remaining less than 50 mol % polymerized units being polymerized α-olefin comonomers, such as $C_3$-$C_{20}$ α-olefins or $C_3$-$C_{12}$ α-olefins. The α-olefin comonomer can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbomadiene, and 5-vinyl-2-norbornene (VNB). Note that throughout this description the terms "non-conjugated diene" and "diene" are used interchangeably.

It should be appreciated that the amount of comonomer used will depend upon the desired density of the polyethylene polymer and the specific comonomers selected. For a given comonomer, the density of the polyethylene polymer produced therefrom decreases as the comonomer content increases. One skilled in the art can readily determine the appropriate comonomer content appropriate to produce a copolymer having a desired density.

In general, suitable polyethylene resins can be produced using a gas-phase metallocene-catalyzed polymerization process in a fluidized-bed reactor. Further details of the catalysts and process are given below.

The polyethylene resins suitable for use in the films of the present invention are described more fully in U.S. Pat. No. 6,255,426.

Suitable polyethylene resins can have one or more of the following properties, with ranges from any lower limit to any upper limit being contemplated:

(a) a composition distribution breadth index ("CDBI") of at least 70% or at least 75% or at least 80%;

(b) a melt index $I_{2.16}$ of from a lower limit of 0.1 or 0.3 to an upper limit of 10 or 15 g/10 min;

(c) a density of from a lower limit of 0.910 or 0.916 or 0.918 to an upper limit of 0.940 or 0.935 or 0.930 or 0.927 g/cm$^3$;

(d) a melt index ratio $I_{21.6}/I_{2.16}$ of from a lower limit of 30 or 35 to an upper limit of 80 or 60; and (e) an Mw/Mn ratio of from a lower limit of 2.5 or 2.8 or 3.0 or 3.2 to an upper limit of 5.5 or 4.5 or 4.0 or 3.8.

Preferred embodiments have all of the characteristics (a)-(e), with any of the combinations of lower and/or upper limits recited. Thus, for example, in one embodiment, the polyethylene resin has a CDBI of at least 70%, a melt index $I_{2.16}$ of from 0.1 to 15 g/10 min, a density of from 0.910 to 0.940 g/cm3, a melt index ratio $I_{21.6}/I_{2.16}$ of from 30 to 80, and an Mw/Mn ratio of from 2.5 to 5.5.

In another embodiment, the polyethylene resin has a CDBI of at least 75%, a melt index $I_{2.16}$ of from 0.1 to 15 g/10 min, a density of from 0.910 to 0.940 g/cm3, a melt index ratio $I_{21.6}/I_{2.16}$ of from 30 to 80, and an Mw/Mn ratio of from 2.5 to 5.5.

In another embodiment, the polyethylene resin has a CDBI of at least 80%, a melt index $I_{2.16}$ of from 0.1 to 15 g/10 min, a density of from 0.910 to 0.940 g/cm3, a melt index ratio $I_{21.6}/I_{2.16}$ of from 30 to 80, and an Mw/Mn ratio of from 2.5 to 5.5.

In another embodiment, the polyethylene resin has the properties of any of the embodiments above, except that the melt index $I_{2.16}$ is of from 0.1 to 10 g/10 min.

In another embodiment, the polyethylene resin has the properties of any of the embodiments above, except that the melt index $I_{2.16}$ is of from 0.3 to 15 g/10 min.

In another embodiment, the polyethylene resin has the properties of any of the embodiments above, except that the melt index $I_{2.16}$ is of from 0.3 to 10 g/10 mm.

In another embodiment, the polyethylene resin has the properties of any of the embodiments above, except that the density is from 0.910 to 0.935 g/cm$^3$.

In another embodiment, the polyethylene resin has the properties of any of the embodiments above, except that the density is from 0.910 to 0.930 g/cm$^3$.

In another embodiment, the polyethylene resin has the properties of any of the embodiments above, except that the density is from 0.910 to 0.927 g/cm$^3$.

In another embodiment, the polyethylene resin has the properties of any of the embodiments above, except that the density is from 0.916 to 0.940 g/cm$^3$.

In another embodiment, the polyethylene resin has the properties of any of the embodiments above, except that the density is from 0.916 to 0.935 g/cm$^3$.

In another embodiment, the polyethylene resin has the properties of any of the embodiments above, except that the density is from 0.916 to 0.930 g/cm³.

In another embodiment, the polyethylene resin has the properties of any of the embodiments above, except that the density is from 0.916 to 0.927 g/cm³.

In another embodiment, the polyethylene resin has the properties of any of the embodiments above, except that the density is from 0.918 to 0.940 g/cm³.

In another embodiment, the polyethylene resin has the properties of any of the embodiments above, except that the density is from 0.918 to 0.935 g/cm³.

In another embodiment, the polyethylene resin has the properties of any of the embodiments above, except that the density is from 0.918 to 0.930 g/cm³.

In another embodiment, the polyethylene resin has the properties of any of the embodiments above, except that the density is from 0.918 to 0.927 g/cm³.

In another embodiment, the polyethylene resin has the properties of any of the embodiments above, except that the melt index ratio $I_{21.6}/I_{2.16}$ is from 30 to 60.

In another embodiment, the polyethylene resin has the properties of any of the embodiments above, except that the melt index ratio $I_{21.6}/I_{2.16}$ is from 35 to 80.

In another embodiment, the polyethylene resin has the properties of any of the embodiments above, except that the melt index ratio $I_{21.6}/I_{2.16}$ is from 35 to 60.

In another embodiment, the polyethylene resin has the properties of any of the embodiments above, except that the Mw/Mn ratio is from 2.5 to 4.5.

In another embodiment, the polyethylene resin has the properties of any of the embodiments above, except that the Mw/Mn ratio is from 2.5 to 4.0.

In another embodiment, the polyethylene resin has the properties of any of the embodiments above, except that the Mw/Mn ratio is from 2.5 to 3.8.

In another embodiment, the polyethylene resin has the properties of any of the embodiments above, except that the Mw/Mn ratio is from 2.8 to 5.0.

In another embodiment, the polyethylene resin has the properties of any of the embodiments above, except that the Mw/Mn ratio is from 2.8 to 4.5.

In another embodiment, the polyethylene resin has the properties of any of the embodiments above, except that the Mw/Mn ratio is from 2.8 to 4.0.

In another embodiment, the polyethylene resin has the properties of any of the embodiments above, except that the Mw/Mn ratio is from 2.8 to 3.8.

In another embodiment, the polyethylene resin has the properties of any of the embodiments above, except that the Mw/Mn ratio is from 3.0 to 5.5.

In another embodiment, the polyethylene resin has the properties of any of the embodiments above, except that the Mw/Mn ratio is from 3.0 to 4.5.

In another embodiment, the polyethylene resin has the properties of any of the embodiments above, except that the Mw/Mn ratio is from 3.0 to 4.0.

In another embodiment, the polyethylene resin has the properties of any of the embodiments above, except that the Mw/Mn ratio is from 3.0 to 3.8.

In another embodiment, the polyethylene resin has the properties of any of the embodiments above, except that the Mw/Mn ratio is from 3.2 to 5.5.

In another embodiment, the polyethylene resin has the properties of any of the embodiments above, except that the Mw/Mn ratio is from 3.2 to 4.5.

In another embodiment, the polyethylene resin has the properties of any of the embodiments above, except that the Mw/Mn ratio is from 3.2 to 4.0.

In another embodiment, the polyethylene resin has the properties of any of the embodiments above, except that the Mw/Mn ratio is from 3.2 to 3.8.

In addition to the properties recited above, the polyethylene resins can be characterized in terms of their properties in monolayer films. Such properties do not limit the polyethylene resins to monolayer film applications, but provide a further means of distinguishing the resins from other resins that may have similar bulk resin properties, but more subtle and significant distinctions evident in monolayer films formed from the resins.

Thus, in another embodiment, the polyethylene resin according to any of the above embodiments is further characterized in that a monolayer film formed from the resin has a Haze value of less than 20%, as measured according to ASTM D-1003-95.

In another embodiment, the polyethylene resin according to any of the above embodiments is further characterized in that a monolayer film formed from the resin has a Haze value of less than 15%, as measured according to ASTM D-1003-95.

In another embodiment, the polyethylene resin according to any of the above embodiments is further characterized in that a monolayer film formed from the resin has an Averaged Modulus M of from 20000 psi (14000 N/cm²) to 60000 psi (41000 N/cm²), where M is the arithmetic mean of the machine direction and transverse direction 1% secant moduli as determined according to ASTM D-882-97.

In another embodiment, the polyethylene resin according to any of the above embodiments is further characterized in that a monolayer film formed from the resin has a Dart Impact Strength of from 120 to 1000 g/mil (4.7 to 40 g/μm).

In another embodiment, the polyethylene resin according to any of the above embodiments is further characterized in that a monolayer film formed from the resin has a Dart Impact Strength of from 120 to 800 g/mil (4.7 to 32 g/μm).

In another embodiment, the polyethylene resin according to any of the above embodiments is further characterized in that a monolayer film formed from the resin has a Dart Impact Strength of from 150 to 1000 g/mil (5.9 to 40 g/μm).

In another embodiment, the polyethylene resin according to any of the above embodiments is further characterized in that a monolayer film formed from the resin has a Dart Impact Strength of from 150 to 800 g/mil (5.9 to 32 g/μm).

In another embodiment, the polyethylene resin according to any of the above embodiments is further characterized in that a monolayer film formed from the resin has a relation between the Averaged Modulus M and Dart Impact Strength (D) complying with formula (1a)

$$D \geq 0.8 \left[ 100 + e^{(11.71 - 0.000268M + 2.183 \times 10^{-9} M^2)} \right] \quad (1a)$$

where M is expressed in units of psi and D is in units of g/mil, or equivalently, complying with formula (1b)

$$D \geq 0.0315 \left[ 100 + e^{(11.71 - 0.03887M + 4.592 \times 10^{-5} M^2)} \right] \quad (1b)$$

where M is expressed in units of MPa and D is in units of g/μm. In both formulae, "e" is the natural logarithm base, 2.718.

5.1.1 Catalysts for Producing Polyethylene Resins

The terms "metallocene" and "metallocene catalyst precursor" as used herein mean compounds having a Group 4, 5 or 6 transition metal (M), with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable co-catalyst (referred to as an "activator"), in order to yield an "lactive metallocene catalyst", i.e., an organometallic complex with a vacant coordination site that can coordinate, insert, and polymerize olefins. In general, a metallocene catalyst precursor can be one of, or a mixture of metallocene compounds of either or both of the following types:

(1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula $$(Cp^1R^1_m)R^3_n(Cp^2R^2_p)MX_q$$

wherein: $Cp^1$ and $Cp^2$ are the same or different cyclopentadienyl rings; $R^1$ and $R^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or a coordination number of two from group 16 of the periodic table of the elements. These mono-cyclopentadienyl complexes have the general formula $$(Cp^1R^1_m)R^3_n(Y_rR^2)MX_s$$

wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group 15 or a coordination number of two from group 16, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Preferred metallocenes are biscyclopentadienyl compounds, preferably bridged by a bridging group including a single carbon, germanium or silicon atom.

Illustrative, but not limiting, examples of suitable biscyclopentadienyl metallocenes of the type described in group (1) above are the racemic isomers of:

μ-$(CH_3)_2$Si(indenyl)$_2$M(Cl)$_2$;
μ-$(CH_3)_2$Si(indenyl)$_2$M(CH$_3$)$_2$;
μ-$(CH_3)_2$Si(tetrahydroindenyl)$_2$M(Cl)$_2$;
μ-$(CH_3)_2$Si(tetrahydroindenyl)$_2$M(CH$_3$)$_2$;
μ-$(CH_3)_2$Si(indenyl)$_2$M(CH$_2$CH$_3$)$_2$; and
μ-$(C_6H_5)_2$C(indenyl)$_2$M(CH$_3$)$_2$;

wherein M is Zr or Hf.

Examples of suitable unsymmetrical cyclopentadienyl metallocenes of the type described in group (1) above are disclosed in U.S. Pat. Nos. 4,892,851; 5,334,677; 5,416,228; and 5,449,651; and in the publication *J. Am. Chem. Soc.* 1988, 110, 6255.

Illustrative, but not limiting, examples of preferred unsymmetrical cyclopentadienyl metallocenes of the type described in group (1) above are:

μ-$(C_6H_5)_2$C(cyclopentadienyl)(fluorenyl)M(R)$_2$;
μ-$(C_6H_5)_2$C(3-methylcyclopentadienyl)(fluorenyl)M(R)$_2$;
μ-$(CH_3)_2$C(cyclopentadienyl)(fluorenyl)M(R)$_2$;
μ-$(C_6H_5)_2$C(cyclopentadienyl)(2-methylindenyl)M(CH$_3$)$_2$;
μ-$(C_6H_5)_2$C(3-methylcyclopentadienyl)(2-methylindenyl)M(Cl)$_2$;
μ-$(C_6H_5)_2$C(cyclopentadienyl)(2,7-dimethylfluorenyl)M(R)$_2$; and
μ-$(CH_3)_2$C(cyclopentadienyl)(2,7-dimethylfluorenyl)M(R)$_2$;

wherein M is Zr or Hf, and R is Cl or CH$_3$.

Examples of monocyclopentadienyl metallocenes of the type described in group (2) above are disclosed in U.S. Pat. Nos. 5,026,798; 5,057,475; 5,350,723; 5,264,405; 5,055,438; and in WO 96/002244.

The metallocene compounds are contacted with an activator to produce an active catalyst. One class of activators is noncoordinating anions, where the term "noncoordinating anion" (NCA) means an anion which either does not coordinate to the transition metal cation or which is only weakly coordinated to the transition metal cation, thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms. Examples of noncoordinating anions can be found in European Publication EP 277 004.

An additional method of making metallocene catalysts uses ionizing anionic pre-cursors which are initially neutral Lewis acids but form the cation and anion upon ionizing reaction with the metallocene compounds. For example, tris(pentafluorophenyl) boron acts to abstract an alkyl, hydride or silyl ligand from the metallocene compound to yield a metallocene cation and a stabilizing non-coordinating anion; see, EP-A-0 427 697 and EP-A-0 520 732. Metallocene catalysts for addition polymerization can also be prepared by oxidation of the metal centers of transition metal compounds by anionic precursors containing metallic oxidizing groups along with the anion groups; see EP-A-0 495 375.

Examples of suitable activators capable of ionic cationization of the metallocene compounds of the invention, and consequent stabilization with a resulting noncoordinating anion, include:

trialkyl-substituted ammonium salts such as:
triethylammonium tetraphenylborate;
tripropylammonium tetraphenylborate;
tri(n-butyl)ammonium tetraphenylborate;
trimethylammonium tetrakis(p-tolyl)borate;
trimethylammonium tetrakis(o-tolyl)borate;
tributylammonium tetrakis(pentafluorophenyl)borate;
tripropylammonium tetrakis(o,p-dimethylphenyl)borate;
tributylammonium tetrakis(m,m-dimethylphenyl)borate;
tributylammonium tetrakis(p-trifluoromethylphenyl)borate;
tributylammonium tetrakis(pentafluorophenyl)borate; and
tri(n-butyl)ammonium tetrakis(o-tolyl)borate;
N,N-dialkyl anilinium salts such as:
N,N-dimethylanilinium tetrakis(pentafluorophenyl)borate;
N,N-dimethylaniliniumtetrakis(heptafluoronaphthyl)borate;
N,N-dimethylanilinium tetrakis(perfluoro-4-biphenyl)borate;
N,N-dimethylanilinium tetraphenylborate;
N,N-diethylanilinium tetraphenylborate; and
N,N-2,4,6-pentamethylanilinium tetraphenylborate;
dialkyl ammonium salts such as:
di-(isopropyl)ammonium tetrakis(pentafluorophenyl)borate; and
dicyclohexylammonium tetraphenylborate; and
triaryl phosphonium salts such as:
triphenylphosphonium tetraphenylborate;
tri(methylphenyl)phosphonium tetraphenylborate; and
tri(dimethylphenyl)phosphonium tetraphenylborate.

Further examples of suitable anionic precursors include those including a stable carbonium ion, and a compatible non-coordinating anion. These include:
tropillium tetrakis(pentafluorophenyl)borate;
triphenylmethylium tetrakis(pentafluorophenyl)borate;
benzene(diazonium)tetrakis(pentafluorophenyl)borate;
tropillium phenyltris(pentafluorophenyl)borate;
triphenylmethylium phenyl-(trispentafluorophenyl)borate;
benzene(diazonium)phenyl-tris(pentafluorophenyl)borate;
tropillium tetrakis(2,3,5,6-tetrafluorophenyl)borate;
triphenylmethylium tetrakis(2,3,5,6-tetrafluorophenyl)borate;
benzene(diazonium)tetrakis(3,4,5-trifluorophenyl)borate;
tropillium tetrakis(3,4,5-trifluorophenyl)borate;
benzene(diazonium)tetrakis(3,4,5-trifluorophenyl)borate;
tropillium tetrakis(3,4,5-trifluorophenyl)aluminate;
triphenylmethylium tetrakis(3,4,5-trifluorophenyl)aluminate;
benzene(diazonium)tetrakis(3,4,5-trifluorophenyl)aluminate;
tropillinum tetrakis(1,2,2-trifluoroethenyl)borate;
triphenylmethylium tetrakis(1,2,2-trifluoroethenyl)borate;
benzene(diazonium)tetrakis(1,2,2-trifluoroethenyl)borate;
tropillium tetrakis(2,3,4,5-tetrafluorophenyl)borate;
triphenylmethylium tetrakis(2,3,4,5-tetrafluorophenyl)borate; and
benzene(diazonium)tetrakis(2,3,4,5-tetrafluorophenyl)borate.

Where the metal ligands include halide moieties, for example, (methyl-phenyl)silylene(tetra-methyl-cyclopentadienyl) (tert-butyl-amido)zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger (as described below), its use in excess of that normally stoichiometrically required for akylation of the metallocene will permit its addition to the reaction solvent with the metallocene compound. Normally, alumoxane would not be added with the metallocene, so as to avoid premature activation, but can be added directly to the reaction vessel in the presence of the polymerizable monomers when serving as both scavenger and alkylating activator.

Alkylalumoxanes are additionally suitable as catalyst activators, particularly for those metallocenes having halide ligands. An alumoxane useful as a catalyst activator typically is an oligomeric aluminum compound represented by the general formula $(R-Al-O)_n$, which is a cyclic compound, or $R(R-Al-O)_nAlR_2$, which is a linear compound. In these formulae, each R or $R_2$ is a $C_1$ to $C_5$ alkyl radical, for example, methyl, ethyl, propyl, butyl or pentyl, and "n" is an integer from 1 to about 50. Most preferably, R is methyl and "n" is at least 4, ie., methylalumoxane(MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Optionally, a scavenging compound is also used. The term "scavenging compound" as used herein refers to those compounds effective for removing polar impurities from the reaction solvent. Such impurities can be inadvertently introduced with any of the polymerization reaction components, particularly with solvent, monomer and comonomer feed, and adversely affect catalyst activity and stability by decreasing or even eliminating catalytic activity, particularly when a metallocene cation-noncoordinating anion pair is the catalyst system. The polar impurities, or catalyst poisons, include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically, the scavenging compound will be an organometallic compound such as the Group-13 organometallic compounds of U.S. Pat. Nos. 5,153,157 and 5,241,025; EP-A-0 426 638; WO-A-91/09882; WO-A-94/03506; and WO-A-93/14132. Exemplary compounds include triethyl aluminum, triethyl borane, tri-isobutyl aluminum, isobutyl aluminumoxane, those having bulky substituents covalently bound to the metal or metalloid center being preferred to minimize adverse interaction with the active catalyst.

Preferably, no scavenging compounds are used, and the reaction is carried out under conditions of substantially no scavengers. The terms "substantially no scavengers" and "substantial devoid or free of Lewis acid scavengers" as used herein indicate less than 100 ppm by weight of such scavengers present in the feed gas to the reactor, or preferably, no intentionally added scavenger, e.g., an aluminum alkyl scavenger, other than that which may be present on the support.

Preferably the catalyst is substantially devoid of non-bridged metallocene compounds; i.e., no such metallocene is intentionally added to the catalyst, or preferably, no such metallocene can be identified in such catalyst. Preferred catalysts are a compounds including a pair of pi bonded ligands (such as cyclopentadienyl ligands) at least one of which has a structure with at least two cyclic fused rings, such as indenyl rings. In a particular embodiment, the metallocene is a substantially single metallocene species including a monoatom silicon bridge connecting two polynuclear ligands pi bonded to the transition metal atom. A particular example of such a bridged metallocene compound is dimethylsilyl-bis-(tetrahydroindenyl)zirconium dichloride, also denoted as $(CH_3)_2Si(H_4Ind)_2ZrCl_2$, where the term "$H_4Ind$" indicates a tetrahydroindenyl group.

The catalyst is preferably supported on silica with the catalyst homogeneously distributed in the silica pores. Preferably, fairly small amounts of methyl alumoxane should be used, such as amounts giving an Al to transition metal molar ratio of from 400 to 30 or from 200 to 50.

5.1.2 Processes for Producing Polyethylene Resins

Suitable processes for producing polyethylene resins are well known in the art. A preferred process is a steady-state polymerization process, such as in a gas-phase fluidized-bed reactor.

Gas phase processes for the homopolymerization and copolymerization of monomers, especially olefin monomers, are well known in the art. Such processes can be conducted, for example, by introducing the gaseous monomer or monomers into a stirred and/or fluidized bed of resin particles and catalyst.

In the fluidized-bed polymerization of olefins, the polymerization is conducted in a fluidized-bed reactor, wherein a bed of polymer particles is maintained in a fluidized state by means of an ascending gas stream including gaseous reaction monomer. The polymerization of olefins in a stirred-bed reactor differs from polymerization in a gas fluidized-bed reactor by the action of a mechanical stirrer within the reaction zone, which contributes to fluidization of the bed. As used herein, the term "fluidized-bed" also includes stirred-bed processes and reactors.

The start-up of a fluidized bed reactor generally uses a bed of pre-formed polymer particles. During the course of polymerization, fresh polymer is generated by the catalytic polymerization of the monomer, and polymer product is withdrawn to maintain the bed at constant volume. An industrially favored process employs a fluidization grid to distribute the fluidizing gas to the bed, and also to act as a support for the bed when the supply of gas is cut off. The polymer produced is generally withdrawn from the reactor via one or more discharge conduits disposed in the lower portion of the reactor, near the fluidization grid. The fluidized bed includes a bed of growing polymer particles, polymer product particles and catalyst particles. This reaction mixture is maintained in a fluidized condition by the continuous upward flow from the base of the reactor of a fluidizing gas which includes recycle gas drawn from the top of the reactor, together with added make-up monomer.

The fluidizing gas enters the bottom of the reactor and is passed, preferably through a fluidization grid, upwardly through the fluidized bed.

The polymerization of olefins is an exothermic reaction, and it is therefore necessary to cool the bed to remove the heat of polymerization. In the absence of such cooling, the bed would increase in temperature until, for example, the catalyst became inactive or the polymer particles melted and began to fuse.

In the fluidized-bed polymerization of olefins, a typical method for removing the heat of polymerization is by passing a cooling gas, such as the fluidizing gas, which is at a temperature lower than the desired polymerization temperature, through the fluidized-bed to conduct away the heat of polymerization. The gas is removed from the reactor, cooled by passage through an external heat exchanger and then recycled to the bed.

The temperature of the recycle gas can be adjusted in the heat exchanger to maintain the fluidized-bed at the desired polymerization temperature. In this method of polymerizing alpha olefins, the recycle gas generally includes one or more monomeric olefins, optionally together with, for example, an inert diluent gas or a gaseous chain transfer agent such as hydrogen. The recycle gas thus serves to supply monomer to the bed to fluidize the bed and to maintain the bed within a desired temperature range. Monomers consumed by conversion into polymer in the course of the polymerization reaction are normally replaced by adding make-up monomer to the recycle gas stream.

The material exiting the reactor includes the polyolefin and a recycle stream containing unreacted monomer gases. Following polymerization, the polymer is recovered. If desired, the recycle stream can be compressed and cooled, and mixed with feed components, whereupon a gas phase and a liquid phase are then returned to the reactor.

A variety of gas phase polymerization processes are known. For example, the recycle stream can be cooled to a temperature below the dew point, resulting in condensing a portion of the recycle stream, as described in U.S. Pat. Nos. 4,543,399 and 4,588,790. This intentional introduction of a liquid into a recycle stream or reactor during the process is referred to generally as a "condensed mode" operation.

Further details of fluidized bed reactors and their operation are disclosed in, for example, U.S. Pat. Nos. 4.243,619, 4,543,399, 5,352,749, 5,436,304, 5,405,922, 5,462,999, and 6,218,484, the disclosures of which are incorporated herein by reference. Suitable process conditions can be determined by one skilled in the art, and are described in PCT publication WO 96/08520 and in U.S. Pat. Nos. 5,763,543 and 6,255,426.

In a specific embodiment, a polyethylene resin is produced by continuously circulating a feed gas stream containing monomer and inerts to thereby fluidize and agitate a bed of polymer particles, adding metallocene catalyst to the bed and removing polymer particles, wherein the catalyst includes at least one bridged bis-cyclopentadienyl transition metal and an alumoxane activator on a common or separate porous support; the feed gas is substantially devoid of a Lewis acidic scavenger and wherein any Lewis acidic scavenger is present in an amount less than 100 wt. ppm of the feed gas; the temperature in the fluidized-bed is no more than 20° C. less than the polymer melting temperature as determined by DSC, at an ethylene partial pressure in excess of 60 psi absolute (410 kPaa); and the removed polymer particles have an ash content of transition metal of less than 500 wt. ppm, the polymer melt index $I_{2.16}$ is less than 10, the MIR is at least 35, and the polymer has substantially no detectable chain end unsaturation as determined by proton nuclear magnetic resonance ($^1$HNMR).

By "substantially no detectable end chain unsaturation" is meant that the polymer has vinyl unsaturation of less than 0.1 vinyl groups per 1000 carbon atoms in the polymer, or less than 0.05 vinyl groups per 1000 carbon atoms, or less than 0.01 vinyl groups per 1000 carbon atoms.

5.2 Shrink Films

The above-described polyethylene resins are particularly suitable for shrink film applications. It has been surprisingly found that films of the invention exhibit improved properties, such as improved clarity, puncture resistance, resistance to hole formation, and generally higher shrink force.

Films of the invention can be cast or blown films having a single layer (monolayer films) or multiple layers (multilayer films). When used in multilayer films, the polyethylene resins described herein can be used in any layer of the film, or in more than one layer of the film, as desired. When more than one layer of the film is formed of, or includes, a polyethylene resin of the present invention, each such layer can be individually formulated; i.e., the layers formed of or including the polyethylene resin can have the same or different chemical composition, density, melt index, thickness, etc., depending upon the desired properties of the film.

To facilitate discussion of different film structures of the invention, the following notation is used herein. Each layer of a film is denoted "A" or "B", where "A" indicates a conventional film layer as defined below, and "B" indicates a film layer formed the polyethylene resin or a blend including the polyethylene resin of the present invention. Where a film includes more than one A layer or more than one B layer, one or more prime symbols (', ", ''', etc.) are appended to the A or B symbol to indicate layers of the same type (conventional or inventive) that can be the same or can differ in one or more properties, such as chemical composition, density, melt index, thickness, etc., within the range of these parameters defined herein. Finally, the symbols for adjacent layers are separated by a slash (/). Using this notation, a three-layer film having an inner layer of the polyethylene resin or blend of the invention disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes of the present invention. The relative thickness of each film layer is similarly denoted, with the thickness of each layer relative to a total film thickness of 100 (dimensionless) is indicated numerically and separated by slashes; e.g., the relative thickness of an A/B/A' film having A and A' layers of 10 µm each and a B layer of 30 µm is denoted as 20/60/20.

For the various films described herein, the "A" layer or layers can be formed of any material known in the art for use in multilayer films or in film-coated products. Thus, for example, an A layer can be formed of a polyethylene homopolymer or copolymer, and the polyethylene can be, for example, a VLDPE, a low density polyethylene (LDPE), a conventional LLDPE, a medium density polyethylene (MDPE), or a high density polyethylene (HDPE), as well as other polyethylenes known in the art. The polyethylene can be produced by any suitable process, including metallocene-catalyzed processes and Ziegler-Natta catalyzed processes. Further, an A layer can be a blend of two or more such polyethylenes, and can include additives known in the art. One skilled in the art will understand that the layers of a multilayer film must have the appropriate viscosity match.

In multilayer structures, one or more A layers can also be an adhesion-promoting tie layer, such as PRIMACOR™ ethylene-acrylic acid copolymers available from The Dow Chemical Co., and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, other polyethylenes, such as HDPE, LDPE, LMDPE, and MDPE, and paper. The "B" layer is formed of a polyethylene resin or a blend including a polyethylene resin of the invention, and can be any of such resins or blends described herein.

In particular embodiments, the B layer includes a blend of the inventive polyethylene copolymer with one or more resins selected from polypropylene, HDPE, MDPE, LDPE, Ziegler-Natta LLDPE, and metallocene LLDPE.

In embodiments including an LDPE resin, the LDPE can be any conventional LDPE; i.e., a polyethylene homopolymer or copolymer having a density of from 0.912 to 0.940 g/cm$^3$. Such LDPEs are well-known and are commercially available from a variety of sources including, for example, ExxonMobil Chemical Co.'s LD line of resins. Such resins are typically produced in high-pressure, free-radical initiated processes. Preferred LDPE resins have a density of from a lower limit of 0.912 or 0.916 or 0.918 or 0.920 g/cm$^3$ to an upper limit of 0.940 or 0.935 or 0.930 or 0.928 g/cm$^3$. Preferred LDPE resins have a melt index $I_{2.16}$ of from a lower limit of 0.05 or 0.1 or 0.2 g/10 min. to an upper limit of 10 or 5 or 2 or 1.5 or 1 g/10 min. Ranges from any lower limit to any upper limit are contemplated.

In embodiments including an HDPE resin, the HDPE can be any conventional HDPE; i.e., a polyethylene homopolymer or copolymer having a density of greater than 0.940 g/cm$^3$ or greater than 0.945 g/cm$^3$. Such HDPEs are well-known and are commercially available from a variety of sources including, for example, ExxonMobil Chemical Co.'s HD line of resins. The melt index $I_{2.16}$ of suitable HDPEs can be readily chosen by one skilled in the art, based on compatibility with the other blend components, processability of the blend, and other considerations well-known in the art.

Additional polymer blends are also contemplated. Thus, the B layer can be a blend of one or more polyethylene resin as described herein, or a blend of one or more polyethylene resins as described herein with one or more additional resins. The latter blend can include, for example, a polyethylene of the invention blended with a compatible LDPE, VLDPE, MDPE or HDPE resin, or other compatible polymeric resins.

When the film is a monolayer film, the resin and film have the properties described herein for a B layer.

As noted above, when a multilayer film has two or more B layers, the B layers can be the same, or can differ in thickness, chemical composition, density, melt index, CDBI, MWD, additives used, or other properties.

The thickness of each layer of the film, and of the overall film, is not particularly limited, but is determined according to the desired properties of the film. Typical film layers have a thickness of about 1 to 1000 μm, more typically about 5 to 200 μm, and typical films have an overall thickness of 10 to 100 μm.

In one embodiment, the present invention provides a single-layer (monolayer) film formed of any of the polyethylene resins or blends of the invention; i.e., a film having a single layer which is a B layer as described above.

In other embodiments, and using the nomenclature described above, the present invention provides multilayer films with any of the following exemplary structures:

(a) two-layer films, such as A/B and B/B';

(b) three-layer films, such as A/B/A', A/A'/B, B/A/B' and B/B'/B";

(c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B'";

(d) five-layer films, such as A/A'/A"/A'"/B, A/A'/A"/B/A'", A/A'/B/A"/A'", A/A'/B/B'/A", A/A'/B/A"/B', A/A'/B/B'/B", A/B/A'/B'/A", A/B/A'/A"/B, B/A/A'/A"/B', A/A'/B/B'/B", A/B/A'/B'/B", A/B/B'/B"/A', B/A/A'/B'/B", A/B/A'/B"/B'", B/A/B'/B"/A', A/B/B'/B"/B'", B/A/B'/B"/B'", B/A'/B'/B"/B'", and B/B'/B"/B'"/B"";

and similar structures for films having six, seven, eight, nine or more layers. It should be appreciated that films having still more layers can be formed using the polymers and blends of the invention, and such films are within the scope of the invention.

As described below, the films can be extrusion cast films or blown films. The films can further be embossed, or produced or processed according to other known film processes.

The films can be tailored to specific applications by adjusting the thickness, materials and order of the various layers, as well as the additives in each layer.

Films according to the invention are particularly suitable for shrink film applications. As used herein, the term "shrink film" or "heat-shrinkable film" indicates a film capable of being shrunk by application of heat, such as a hot fluid, typically hot air. Such films are used, for example, in packaging and bundling applications.

Additives can be provided in the various film layers, as is well-known in the art.

5.2.1 Producing Films

Films may be formed by any number of well known extrusion or coextrusion techniques. Any of the blown or cast film techniques commonly used are suitable. For example, a resin composition can be extruded in a molten state through a flat die and then cooled to form a film, in a cast film process. Alternatively, the composition can be extruded in a molten state through an annular die and then blown and cooled to form a tubular, blown film, which can then be axially slit and unfolded to form a flat film. Films of the invention may be unoriented, uniaxially oriented or biaxially oriented. Physical properties of the film may vary from those of the polymer blend, depending on the film forming techniques used.

As a specific example, blown films can be prepared as follows. The resin composition is introduced into the feed hopper of an extruder, and the film is extruded through the extruder die into a film and cooled by blowing air onto the surface of the film. The film is drawn from the die typically forming a cylindrical film that is cooled, collapsed and optionally subjected to a desired auxiliary process, such as slitting, treating, sealing or printing. The finished film can be wound into rolls for later processing. A particular blown film process and apparatus suitable for forming films according to embodiments of the present invention is described in U.S. Pat. No. 5,569,693.

Multiple-layer films may be formed by methods well known in the art. The materials forming each layer may be coextruded through a coextrusion feedblock and die assembly to yield a film with two or more layers adhered together but differing in composition. Coextrusion can be adapted to cast film or blown film processes. Multiple-layer films may also be formed by combining two or more single layer films prepared as described above.

The total thickness of monolayer of multilayer films may vary based upon the application desired. A total film thickness of about 5-1000 μm is suitable for most applications. For use as industrial shrink films for bundling articles on pallets, typical film thickness is from about 50 μm to about 1000 μm, more typically from about 80 μm to about 200 μm. For use as retail shrink films for bundling articles for distribution or for supermarket display, for example, typical film thickness is from about 10 to about 200 μm, more typically from about 35 to about 80 μm. Those skilled in the art will appreciate that the thickness of individual layers for multilayer films may be adjusted based on desired end use performance, resin or copolymer employed, equipment capability and other factors.

5.3 Film Properties

Monolayer films of resins according to the invention can have the averaged modulus, haze, and dart impact strength, and dart impact versus averaged modulus properties as described above. It should be appreciated that the monolayer properties described above define the polyethylene resin in a particular film form. Actual films, monolayer or multilayer, can have different overall properties, depending upon the additives used, the types of polymeric materials, if any, blended with the inventive polyethylene resins, the number and characteristics of different film layers, etc. These films, however, can still be defined in terms of the polyethylene resin used therein, the resin, in turn, being defined by its resin and monolayer film properties, as well as in terms of the properties of the desired film composition and structure.

Embodiments of the invention can have any combination of the properties described above, such as, but not limited to, CDBI, melt index, density, melt index ratio and Mw/Mn.

In one embodiment, the invention provides a heat-shrinkable monolayer film including a blend of any of the inventive polyethylene copolymers described herein and a low density polyethylene (LDPE). In this embodiment, the film can have a clarity value of at least 10% or at least 15% or at least 20%, and a puncture resistance damaging energy value of at least 40 mJ/μm or at least 65 mJ/μm or at least 90 mJ/μm. In particular embodiments, the film can have one or more of the following characteristics, in any combination:

a machine direction plastic force of less than 7 cN/15 mm or less than 6 cN/15 mm;

a machine direction shrink stress of at least 1.10 MPa or at least 1.12 MPa or at least 1.14 MPa;

a transverse direction shrink stress of at least 1.29 MPa;

an averaged shrink stress of at least 1.18 MPa or at least 1.20 MPa or at least 1.22 MPa, the averaged shrink stress being the arithmetic mean of machine direction and transverse direction shrink stress values;

a weight percentage of the inventive polyethylene resin of from a lower limit of 5 or 10% or 15% or 20% or 30% to an upper limit of 95% or 90% or 80% or 70%, based on the total weight of the inventive polyethylene resin and the LDPE resin;

a film thickness of from a lower limit of 10 μm or 15 μm or 30 μm to an upper limit of 150 μm or 100 μm or 80 μm; and a film thickness of from a lower limit of 50 μm or 80 μm or 100 μm to an upper limit of 500 μm or 300 μm or 200 μm.

In another embodiment, the invention provides a heat-shrinkable multilayer film including at least one layer formed of on including a blend of any of the inventive polyethylene copolymers described herein and a low density polyethylene (LDPE). In this embodiment, the film can have a clarity value of at least 20% or at least 50% or at least 70%. In particular embodiments, the film can have one or more of the following characteristics, in any combination:

a puncture resistance damaging energy of at least 100 mJ/μm or at least 125 mJ/μm or at least 150 mJ/μm;

a machine direction plastic force of less than 7 cN/15 mm or less than 5 cN/15 mm or less than 4 cN/15 mm or less than 3 cN/15 mm;

a machine direction thermal force of at least 1.25 N/15 mm or at least 1.30 N/15 mm;

a machine direction shrink stress value of at least 1.20 MPa or at least 1.25 MPa;

a weight percentage of the inventive polyethylene resin of from a lower limit of 5 or 10% or 20% or 30% or 50% or 70% to an upper limit of 95% or 90% or 80%, based on the total weight of the inventive polyethylene resin and the LDPE resin;

a film thickness of from a lower limit of 10 μm or 15 μm or 30 μm to an upper limit of 150 μm or 100 μm or 80 μm; and a film thickness of from a lower limit of 50 μm or 80 μm or 100 μm to an upper limit of 500 μm or 300 μm or 200 μm.

In another embodiment, the invention provides a heat-shrinkable film having at least one layer formed of any of the inventive polyethylene copolymers described herein, without additional polymeric components; i.e., formed of an unblended polyethylene copolymer as described herein. In this embodiment, the film can have a clarity value of at least 10% or at least 30% or at least 50%, and a puncture resistance damaging energy value of at least 100 mJ/μm or at least 140 mJ/μm or at least 170 mJ/μm In particular embodiments, the film can have one or more of the following characteristics, in any combination:

a machine direction plastic force of less than 7 cN/15 mm or less than 5 cN/15 mm or less than 3 cN/15 mm;

a film thickness of from a lower limit of 10 μm or 15 μm or 30 μm to an upper limit of 150 μm or 100 μm or 80 μm; and a film thickness of from a lower limit of 50 μm or 80 μm or 100 μm to an upper limit of 500 μm or 300 μm or 200 μm.

In any of the embodiments including a blend of the inventive resin and an LDPE, the blend can further include an HDPE in an amount of from a lower limit of 0.5% or 1% or 2% or 5% to an upper limit of 20% or 15% or 10% by weight, based on the total weight of the inventive polyethylene resin and the LDPE resin.

5.4 Applications

There are many potential applications of films produced from the polymer blends described herein. These films can be made into other forms, such as tape, by any one of a number of well known cutting, slitting, and/or rewinding techniques. They may be useful as stretch, sealing, or oriented films.

Typical applications include:

packaging, such as bundling, packaging and unitizing a variety of products including various foodstuffs, rolls of carpet, liquid containers and various like goods normally containerized and/or palletized for shipping, storage, and/or display;

flexible food packaging, including frozen food packaging;

bags, such as trash bags and liners, industrial liners, shipping sacks and produce bags;

surface protection applications, with or without stretching, such as in the temporary protection of surfaces during manufacturing, transportation, etc.; and other films, such as agricultural films, silage films and greenhouse films.

Surfaces of the films of this invention can be modified by known and conventional post-forming techniques such as corona discharge, chemical treatment, flame treatment, and the like.

6. EXAMPLES

Materials and Methods

Tensile strength values (tensile yield, ultimate tensile strength, elongation at break and elongation at yield) were measured (machine direction ("MD") and transverse direction ("TD")) in accordance with ASTM D882-97. The film gauge was measured using ASTM D5947-96 Method C, except that the micrometer calibration was performed annually with a commercially available gauge block (Starret Webber 9, JCV1&2).

1% Secant (both MD and TD) was determined in accordance with ASTM D882-97. The film gauge was measured according to ASTM D5947-96 Method C, except that the micrometer calibration was performed annually with a commercially available gauge block (Starret Webber 9, JCV1&2). As used herein, the term "tensile modulus" indicates the 1% secant value.

Melt Index ($I_{2.16}$), i.e., the melt flow rate at 190° C. under a load of 2.16 kg, was determined according to ASTM D-1238-95, condition E. Melt index $I_{2.16}$ is reported in units of g/10 min, or the numerically equivalent units of dg/min.

Flow Index ($I_{21.6}$), i.e., the melt flow rate at 190° C. under a load of 21.6 kg (sometimes also termed "high load melt index" or "HLMI"), was determined according to ASTM D-1238-95, condition F. Melt index $I_{21.6}$ is reported in units of g/10 min, or the numerically equivalent units of dg/min.

The ratio of two melt flow rates is the "Melt Flow Ratio" or MFR, and is most commonly the ratio of $I_{21.6}/I_{2.16}$. "MFR" can be used generally to indicate a ratio of melt flow rates measured at a higher load (numerator) to a lower load (denominator). As used herein, the term "melt index ratio" or "MIR" refers specifically to the ratio $I_{21.6}/I_{2.16}$. Melt flow ratios are dimensionless.

Density (g/cm$^3$) was determined using chips cut from plaques compression molded in accordance with ASTM D-1928-96 Procedure C, aged in accordance with ASTM D618 Procedure A, and measured according to ASTM D1505-96.

Elmendorf tear was determined in accordance with ASTM D1922-94a. The film gauge was measured according to ASTM D374-94 Method C, except that the micrometer calibration was performed annually with a commercially available gauge block (Starret Webber 9, JCV1&2).

Dart Impact Strength (sometimes termed "dart drop") were measured in accordance with ASTM DI 709 Method A, at 26 inches (66 cm).

The film gauge was measured according to ASTM D374-94 Method C, except that the micrometer calibration was performed annually with a commercially available gauge block (Starret Webber 9, JCV1&2).

Gloss was measured according to ASTM D-2457.
Haze was measured according to ASTM D-1003.
Clarity was measured according to ASTM D-1746.

Puncture Resistance Damaging Energy and Puncture Resistance Damaging Force measure the low speed puncture properties of films. The test provides load versus deformation response values under multiaxial deformation conditions at fixed, low test speed. A piston with a standard probe fixed to the load cell is pushed through a film sample in a circular sample holder up to break. The load is measured on the load cell and the deformation is measured by the travel of the cross-head. The Puncture Resistance Damaging Energy is the total energy absorbed by the film sample up to the break point; i.e., the integrated area of the load-deflection curve up the break point. The value is normalized to the film thickness, and expressed in units of mJ/µm. the Puncture Resistance Damaging Force is the load at the break point. It is normalized for film thickness and expressed in units of N/µm. Values were measured using a 2000 N load cell.

Two methods were used to measure shrink percentage. Method (I), provides free shrinkage values comparable to ASTM D-2732-96. In this method, shrinkage is measured as follows. 50 mm film samples are heated on a 200 µm thick copper foil substrate at a temperature of 150° C. The copper foil is positioned on a suitable heat source, such as a hot plate, and silicone oil is provided between the hot plate surface and the copper foil, and between the copper foil and the film sample. The hot plate and silicone/copper are preheated, and the film sample is placed on the preheated foil. The sample remains on the hot plate until no further shrinkage is observed, then is allowed to cool on the foil. The percentage of shrinkage in the machine direction and transverse direction is then measured.

In Method (II), shrinkage, plastic force, thermal force and shrink stress are determined in a procedure based on ASTM D-2838-95, method A. Two film samples are exposed to a given temperature, for a given time, and allowed to cool to room temperature. Alternatively, the film is exposed to a programmed temperature slope, and the temperatures that corresponds to the beginning and end of shrinkage are determined. During the test, one of the two samples is connected to a force transducer, and the other is connected to a displacement transducer. A thermocouple measures the temperature at a position several millimeters from the middle of the sample. Force, displacement and temperature are continuously measured and recorded.

A measure of composition distribution is the "Composition Distribution Breadth Index" ("CDBI"). The definition of Composition Distribution Breadth Index (CDBI), and the method of determining CDBI, can be found in U.S. Pat. No. 5,206,075 and PCT publication WO 93/03093. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF) as described in Wild, et al., *J. Poly. Sci., Poly. Phys. Ed.*, vol. 20, p. 441 (1982). To determine CDBI, a solubility distribution curve is first generated for the copolymer. This may be accomplished using data acquired from the TREF technique. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a Mn≧15,000, where Mn is the number average molecular weight of the fraction. Any low weight fractions present generally represent a trivial portion of the polymer. The remainder of this description and the appended claims maintain this convention of assuming all fractions have Mn≧15,000 in the CDBI measurement.

As used herein, "molecular weight" indicates any of the moments of the molecular weight distribution, such as the number average, weight average, or Z-average molecular weights, and "molecular weight distribution" indicates the ratio of two such molecular weights. In general, molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. These and higher moments are included in the term "molecular weight." The desired molecular weight distribution (MWD) function (such as, for example, Mw/Mn or Mz/Mw) is the ratio of the corresponding M values. Measurement of M and MWD by conventional methods such as gel permeation chromatography is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems* 3rd ed., Hemisphere Pub. Corp., NY, (1989) 155-160; U.S. Pat. No. 4,540,753; Verstrate et al., *Macromolecules*, vol. 21, (1988) 3360; and references cited therein.

GPC measurements were made on a Waters 150C. GPC instrument equipped with a differential refraction index ("DRI") detector. GPC columns are calibrated by running a series of polystyrene standards. Molecular weights of polymers other than polystyrenes are conventionally calculated by using Mark Houwink coefficients for the polymer in question.

Short Chain Branching (SCB) was determined by $^1$HNMR (proton nuclear magnetic resonance) with data collected at 500 MHz. Spectra were referenced by setting the polymer backbone signal to 1.347 ppm. Methyl group contents in ethylene 1-olefin copolymers were calculated from the $^1$HNMR spectrum using the following formula:

Methyl Groups/1000 Carbons=$(I_{CH_3}*0.33*1000)/(I_{0.5-2.1\ ppm}*0.5)$ where $I_{CH_3}$ is the normalized methyl signal area in the region between 0.88 and 1.05 ppm and $I_{0.5-2.1\ ppm}$ is the area between 0.50 and 2.10 ppm. The number of methyl groups will correspond to the number of short chain branches in the polymer assuming that the short chain branches contain 1 methyl (—CH$_3$) group and that all methyl groups are a result of short chain branching. The same NMR method can be used to determine vinyl end unsaturation.

Granular Bulk Density is determined as follows. Granular polymer particles are poured via a 7/8" (2.2 cm) diameter funnel into a fixed volume cylinder of 400 mL. The bulk density is measured as the weight of resin divided by 400 mL to give a value in g/mL.

Particle Size is measured by determining the weight of material collected on a series of U.S. Standard sieves and determining the weight average particle size in micrometers based on the sieve series used.

Extractability is determined according to FDA regulation 21 CFR 177.1520(d)(3)(ii).

For measurements of film properties, the film samples were conditioned for a minimum of 24 hours at 23° C. prior to testing.

Examples 1-3

Examples 1A and 1B are show two examples for preparing catalysts suitable for producing polyethylene copolymers according to the invention. In Examples 2A and 2B, the catalysts of Examples 1A and 1B, respectively, are used to produce two ethylene/hexene copolymer resins, denoted A and B. In Examples 3A and 3B, the properties of the polyethylene resins and unblended monolayer films of the resins are shown. These Examples are also shown in U.S. Pat. No. 6,255,426.

Example 1A

A solution of 1300 mL of 30 wt % alumoxane (MAO) in toluene as determined by reference to the total Al content, which may include unhydrolyzed TMA, was charged to a two gallon (7.57 L), jacketed glass-walled reactor, equipped with a helical ribbon blender and an auger-type shaft. 2080 mL of toluene was added and stirred. A suspension of 31.5 g dimethylsilyl-bis-(tetrahydroindenyl)zirconium dichloride (Me$_2$Si(H$_4$Ind)$_2$ZrCl$_2$) in 320 mL of toluene purchased from Albemarle Labs, was cannulated to the reactor. An additional bottle of dry toluene (250 mL) was used to rinse solid metallocene crystals into the reactor by cannula under nitrogen pressure. A color change from colorless to yellow/orange was noted upon addition of the metallocene to the MAO solution. The mixture was allowed to stir at 69° F. (20.6° C.) for one hour, before being transferred to a four-liter Erlenmeyer flask under nitrogen. Silica (1040 g, Davison MS 948, 1.65 mL/g pore volume) was charged to the reactor. Half of the solution from the 4 L Erlenmeyer flask was then transferred back to the 2 gallon (7.57 L) stirred glass reactor. The reaction temperature rose from 70° F. (21.1° C.) to 100° F. (37.8° C.) in a five minute exotherm. The balance of the solution in the 4 L Erlenmeyer flask was subsequently added back to the glass reactor, and stirred twenty minutes. Then, toluene was added (273 mL, 238 g) to dilute the active catalyst slurry, and stirred an additional twenty-five minutes. Antistat AS-990, a surface modifier made from ethoxylated stearylamine sold by Witco Chemical Corp. (7 g in 73 mL toluene) was cannulated to the reactor and the slurry mixed for thirty minutes. Removal of solvent commenced by reducing pressure to less than 18 inches of mercury (457 mmHg) while feeding a small stream of nitrogen into the bottom of the reactor and raising the temperature from 74° F. (23.3° C.) to 142° F. (61.1° C.) over a period of one hour. Then, five additional hours of drying at 142° F. (61.1° C.) to 152° F. (66.7° C.) and vacuum which ranged from 5 inches to 22 inches Hg (127 to 559 mmHg) were used to dry the support and yield 1709.0 g of free-flowing active supported catalyst material. Head space gas chromatograph (HSGC) measurements showed 13,000 weight parts per million (1.3 wt %) of residual toluene. A second drying step under stronger vacuum conditions, resulted in HSGC analysis measurement of residual toluene at 0.18%. Elemental analysis showed 0.40% Zr, 10.75% Al, 30.89% Si, 0.27% Cl, 9.26% C, 2.05% H (all percentages shown herein are weight percent).

Example 1B

A solution of 1125 mL of 30 wt % alumoxane (MAO) in toluene as determnined by reference to the total Al content, which may include unhydrolyzed TMA, was charged to a two gallon (7.57 L), jacketed glass-walled reactor, equipped with a helical ribbon blender and an auger-type shaft. 1800 mL of toluene was added and stirred. A suspension of 30.8 g dimethylsilyl-bis-(tetrahydroindenyl)zirconium dichloride (Me$_2$Si(H$_4$Ind)$_2$ZrCl$_2$) in 320 mL of toluene purchased from Albemarle Labs, was cannulated into the reactor. An additional 150 mL of toluene was used to rinse solid metallocene crystals into the reactor by cannula under nitrogen pressure. A color change from colorless to yellow/orange was noted upon addition of the metallocene to the MAO solution. The mixture was allowed to stir at 69° F. (20.6° C.) for one hour, before being transferred to a four-liter Erlenmeyer flask under nitrogen. Silica (899 g, Davison MS 948, 1.65 mL/g pore volume) was charged to the reactor. Half of the solution from the 4 L Erlenmeyer flask was then transferred back to the 2 gallon (7.57 L) stirred glass reactor. The reaction temperature rose from 70° F. (21.1° C.) to 100° F. (37.8° C.) in a five minute exotherm. The balance of the solution in the 4 L Erlenmeyer flask was subsequently added back to the glass reactor, and stirred twenty minutes. Then, toluene was added (273 mL, 238 g) to dilute the active catalyst slurry, and stirred an additional twenty-five minutes. Antistat AS-990 was cannulated to the reactor and the slurry mixed for thirty minutes. Removal of solvent commenced by reducing pressure to less than 18 inches of mercury (457 mmHg) while feeding a small stream of nitrogen into the bottom of the reactor and raising the temperature from 74° F. (23.3° C.) to 142° F. (61.1° C.) over a period of one hour. Then, nine and a half additional hours of drying at 142° F. (61.1° C.) to 152° F. (66.7° C.) at a vacuum which ranged from 5 inches to 22 inches Hg (177 to 559 mmHg) were used to dry the support and yield 1291.4 g of free-flowing active supported catalyst material.

Example 2

The catalysts formed in Examples 1A and 1B were used to prepare polyethylene copolymers 2A and 2B, respectively, as follows.

The polymerization was conducted in a continuous gas phase fluidized-bed reactor having a 16.5 inch (41.9 cm) diameter with a bed height of approximately 12 feet (3.6 m). The fluidized-bed is made up of polymer granules. The gaseous feed streams of ethylene and hydrogen together with liquid comonomer were mixed together in a mixing tee arrangement and introduced below the reactor bed into the recycle gas line. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream.

Solid catalyst 1A or 1B was injected directly into the fluidized-bed using purified nitrogen as a carrier. Its rate of injection was adjusted to maintain a constant production rate of the polymer. The reacting bed of growing polymer particles is maintained in a fluidized state by the continuous flow of the make-up feed and recycle gas through the reaction zone. A superficial gas velocity of 1-3 ft/s (0.3 to 0.9 m/s) was used to achieve this. The reactor was operated at a total pressure of 300 psig (2068 kPa gauge). To maintain a constant reactor temperature, the temperature of the recycle gas is continuously adjusted up or down to accommodate any changes in the rate of heat generation due to the polymerization.

The fluidized-bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small stream of humidified nitrogen to deactivate any trace quantities of residual catalyst and cocatalyst.

The polymerization conditions are summarized in Table 1.

TABLE 1

| Polymerization Conditions | 2A | 2B |
| --- | --- | --- |
| Zr (wt %) | 0.43 | 0.50 |
| Al (wt %) | 11.6 | 11.4 |
| Al/Zr (mol/mol) | 91.2 | 77.1 |
| Temperature (° C.) | 79.4 | 85 |

TABLE 1-continued

| Polymerization Conditions | 2A | 2B |
| --- | --- | --- |
| Pressure (bar) | 21.7 | 21.7 |
| Ethylene (mol %) | 25.0 | 49.9 |
| Hydrogen (mol ppm) | 275 | 445 |
| Hexene (mol %) | 0.23 | 0.32 |
| Bed Weight (kg PE) | 113 | 121 |
| Production Rate (kg PE/hr) | 27.6 | 35.5 |
| Catalyst Productivity (kg PE/kg catalyst) | 1690 | 2287 |
| Bulk Density (g/mL) | 0.448 | 0.450 |
| Average Particle Size (μm) | 920 | 803 |
| Ash (ppm) | 507 | 386 |

The parameters in Table 1 were determined as described previously; the Zr, Al weight percent and ash levels were by elemental analysis. No aluminum alkyl compounds were added to the reactor as scavenger. The runs were continued for about 3 days.

Example 3

Resin properties, and properties of monolayer blown films formed from the resins using conventional film blowing equipment are shown in Tables 2-3, wherein "3A" and "3B" correspond to the resin (or film produced from the resin) 5 produced in Examples 2A and 2B, respectively.

TABLE 2

Resin Properties

|  | 3A | 3B |
| --- | --- | --- |
| Density (g/cm$^3$) | 0.9190 | 0.9257 |
| Melt Index $I_{2.16}$ (dg/min) | 1.10 | 0.62 |
| MIR, $I_{21.6}/I_{2.16}$ | 46.0 | 57.6 |
| Mw | 92200 | 104700 |
| Mn | 18300 | 17900 |
| Mz | 208400 | 287500 |
| Mw/Mn | 5.04 | 5.85 |
| 1st Melting Peak (° C.)[a] | 108.6 | 122.6 |
| 2nd Melting Peak (° C.)[a] | 119.3 | 117.3 |
| CDBI (%) | 86 | 83.10 |
| SCB (per 1000 C) | 15.4 | 10.6 |
| C6 (wt %) | 9.3 | 6.4 |
| C6 (mol %) | 3.3 | 2.2 |

[a]note: the sample had been molten and been allowed to cool once previously

TABLE 3

Monolayer Blown Film Properties

|  | 3A | 3B |
| --- | --- | --- |
| Blow-up Ratio | 2.5 | 2.1 |
| Gauge, mil (μm) | 2.1 (53) | 2.0 (51) |
| MD 1% Secant Modulus, psi (N/cm$^2$) | 29420 (20284) | 45070 (31075) |
| TD 1% Secant Modulus, psi (N/cm$^2$) | 31230 (21532) | 47420 (32695) |
| Average Modulus, psi (N/cm$^2$) | 30325 (20908) | 46245 (31885) |
| MD Elmendorf Tear, g/mil | 207 | 134 |
| TD Elmendorf Tear, g/mil | 430 | 477 |
| 26" (66 cm) Dart Impact Strength, g/mil | 410 | 156 |
| Calculated DIS(M) minimum, g/mil[a] | 294 | 123 |
| Haze, % | 10.2 | 9.9 |
| Extractability | 1.0 | not available |

[a]calculated from formula (1) herein.

Example 4

A larger number of additional further tests were performed with different samples made according to the invention in a similar manner, and the results are shown in Table 4. This example also shown in U.S. Pat. No. 6,255,426.

TABLE 4

| Average Modulus | | Dart Impact Strength (26 inch) | |
|---|---|---|---|
| | | Calculated from Formula (1), | Measured, |
| Psi | N/cm$^2$ | g/mil | g/mil |
| 25,575 | 17,633 | 508 | 611 |
| 28,580 | 19,705 | 353 | 456 |
| 28,990 | 19,987 | 337 | 553 |
| 29,145 | 20,094 | 332 | 451 |
| 30,325 | 20,908 | 294 | 410 |
| 31,450 | 21,684 | 264 | 284 |
| 31,610 | 21,794 | 260 | 257 |
| 32,000 | 22,063 | 251 | 349 |
| 32,140 | 22,159 | 248 | 223 |
| 33,780 | 23,290 | 217 | 251 |
| 34,160 | 23,552 | 211 | 262 |
| 35,170 | 24,248 | 196 | 223 |
| 35,970 | 24,800 | 186 | 261 |
| 37,870 | 26,110 | 167 | 251 |
| 39,325 | 27,113 | 155 | 197 |
| 39,390 | 27,158 | 154 | 193 |
| 43,675 | 30,112 | 131 | 167 |
| 46,245 | 31,884 | 123 | 156 |
| 47,730 | 32,908 | 119 | 147 |
| 49,460 | 34,101 | 115 | 143 |

Examples 5-37

In the following examples, properties of films of various resins were measured. The resins used are summarized in Table 5.

TABLE 5

| | Melt Index $I_{2.16}$ (g/10 min) | Density (g/cm$^3$) |
|---|---|---|
| LDPE Resins | | |
| LDPE-A | 0.3 | 0.922 |
| LDPE-B | 0.25 | 0.922 |
| LDPE-C | 1.0 | 0.920 |
| LDPE-D | 0.75 | 0.923 |
| LDPE-E | 0.8 | 0.923 |
| LDPE-F | 0.75 | 0.923 |
| LDPE-G | 2.0 | 0.923 |
| LLDPE Resins | | |
| LLDPE-A | 1.0 | 0.918 |
| LLDPE-B | 0.5 | 0.918 |
| LLDPE-C | 0.8 | 0.926 |
| LLDPE-D[a] | 0.9 | 0.920 |
| LLDPE-E[b] | 0.9 | 0.920 |
| Inventive Resins | | |
| Resin A | 1.0 | 0.920 |
| Resin B | 0.9 | 0.925 |
| Resin C | 0.5 | 0.925 |
| Resin D | 2.0 | 0.920 |

[a] 50/50 blend by weight of BP0209KJ and BP0209AA
[b] 50/50 blend by weight of BP0209 and BP0209AA In Table 5, the LDPE resins are high pressure low density resins, and the LLDPE resins are Ziegler-Natta catalyzed resins. The Resins A-D were produced in a gas phase fluidized bed process with a dimethylsilyl-bridged bis(tetrahydroindenyl) zirconium dichloride catalyst.

In Examples 5-37, Example numbers followed by the letter "C" are comparative examples.

Examples 5-8C

Monolayer films were produced using resins as shown in Table 6. A comparative resin in Example 8C was used, the resin being a conventional 70/30 wt/wt blend of LDPE and LLDPE. The films were produced in a single bubble blown film process with an extruder of 120 mm diameter and an L/D ratio of 24; a die diameter of 175 mm; a die gap of 1.2 mm; a total output of about 200 kg/hr; a blow-up ratio of 4.5; an extruder temperature setting of 170-180° C.; and a die temperature of 180-190° C. The frost line height was 800 mm. and. Melt pressure and temperature were 344-362 bar and 196-204° C., respectively, and internal bubble cooling was used. The extruder was equipped with a dual lip air ring.

The results are shown in Table 6. The data show that the films of the invention have better puncture resistance values as compared to the reference film (8C), while maintaining equivalent shrinkage performance and superior optical properties. In addition, the inventive films show much lower machine direction plastic force values, indicating less tendency to hole formation during shrinkage.

TABLE 6

| | 5 | 6 | 7 | 8C |
|---|---|---|---|---|
| Composition (wt %) | 70% LDPE-A 30% Resin A | 45% LDPE-A 55% Resin A | 25% LDPE-A 75% Resin A | 70% LDPE-A 30% LLDPE-A |
| Thickness (μm) | 170 | 170 | 170 | 170 |
| Haze (%) | 18.3 | 19.1 | 19.2 | 17.1 |
| Clarity (%) | 15 | 23.4 | 43.2 | 2.7 |
| Gloss at 60° (%) | 7.4 | 7.7 | 9 | 7 |
| Tensile at Yield, MD (MPa) | 12.5 | 12.5 | 12.7 | 11.4 |
| Tensile at Yield, TD (MPa) | 12 | 12.4 | 12.4 | 11.3 |
| Tensile at Break, MD (MPa) | 24.6 | 28.5 | 36 | 24.5 |
| Tensile at Break, TD (MPa) | 26.3 | 28.9 | 38.1 | 22.9 |
| Elongation at Break, MD (%) | 538 | 595 | 660 | 568 |
| Elongation at Break, TD (%) | 580 | 623 | 699 | 607 |
| Energy to Break, MD (mJ/mm$^3$) | 83.5 | 96.5 | 118 | 86.4 |
| Energy to Break, TD (mJ/mm$^3$) | 89.4 | 99.2 | 128 | 84.7 |

TABLE 6-continued

|  | 5 | 6 | 7 | 8C |
|---|---|---|---|---|
| Tensile Modulus, MD (MPa) | 245 | 263 | 279 | 214 |
| Tensile Modulus, TD (MPa) | 239 | 257 | 270 | 219 |
| Puncture Resistance Damaging Energy (mJ/μm) | 104 | — | 194 | 87.4 |
| Puncture Resistance Damaging Force (N/μm) | 1.72 | — | 2.38 | 1.49 |
| Shrinkage, MD[a] (%) | 52 | 58 | 52 | 59 |
| Shrinkage, TD[a] (%) | 42 | 42 | 43 | 42 |
| Total shrink (%) | 94 | 100 | 95 | 101 |
| Shrink ratio, MD/TD | 55/45 | 58/42 | 55/45 | 58/42 |
| Plastic Force, MD (cN/15 mm) | 5.9 | 2.5 | 2 | 8.3 |
| Plastic Force, TD (cN/15 mm) | 5.1 | 3.2 | 1.4 | — |
| Shrinkage, MD[b] (%) | 54 | 45 | 42 | 55 |
| Shrinkage, TD[b] (%) | 45 | 39 | 29 | 33 |
| Thermal Force, MD (N/15 mm) | 3.14 | 2.95 | 2.92 | 2.77 |
| Thermal Force, TD (N/15 mm) | 3.4 | 3.32 | 3.38 | 2.86 |
| Shrink Stress, MD (MPa) | 1.23 | 1.16 | 1.15 | 1.09 |
| Shrink Stress, TD (Mpa) | 1.33 | 1.3 | 1.33 | 1.12 |

[a]Method (I)
[b]Method (II)

Examples 9-12C

Monolayer films were produced using resins as shown in Table 7. A comparative resin in Example 12C was used, the resin being a conventional 80/20 wt/wt blend of LDPE and LLDPE. The films were produced in a single bubble blown film process on an extruder with a die diameter of 315 mm; a die gap of 0.8 mm; a total output of 244-298 kg/hr; a blow-up ratio of 4.0, and a die temperature of 160-180° C. The frost line height was 800 mm in Example 10, 1000 mm in Examples 11 and 12C, and 1200 mm in Example 9. The extruder was 120 mm in diameter and had an L/D ratio of 25. The temperature setting on the extruder was 160-170° C. Melt pressure and temperature were 350-375 bar and 195-200° C., respectively, and internal bubble cooling was used.

The results are shown in Table 7. The data show that the films of the invention have better optical properties and less tendency to hole formation (as shown by lower plastic force values) while maintaining equivalent shrinkage properties.

TABLE 7

|  | 9 | 10 | 11 | 12C |
|---|---|---|---|---|
| Composition (wt %) | 80% LDPE-B 20% Resin A | 20% LDPE-B 80% Resin A | 50% LDPE-B 50% Resin A | 80% LDPE-B 20% LLDPE-B |
| Thickness (μm) | 150 | 110 | 110 | 150 |
| Haze (%) | 17.1 | 18.4 | 17.4 | 20.2 |
| Clarity (%) | 22.7 | 42.5 | 31.5 | 1.2 |
| Tensile at Yield, MD (MPa) | 12.2 | 12.3 | 12.4 | 12.2 |
| Tensile at Yield, TD (MPa) | 11.6 | 12.2 | 12.4 | 11.7 |
| Tensile at Break, MD (MPa) | 26.7 | 41.5 | 37.5 | 12.8 |
| Tensile at Break, TD (MPa) | 29.9 | 41.6 | 38.3 | 11.8 |
| Elongation at Break, MD (%) | 515 | 654 | 646 | 595 |
| Elongation at Break, TD (%) | 621 | 678 | 654 | 542 |
| Energy to Break, MD (mJ/mm$^3$) | 83 | 128 | 129 | 106 |
| Energy to Break, TD (mJ/mm$^3$) | 104 | 130 | 128 | 87 |
| Tensile Modulus, MD (MPa) | 238 | 288 | 263 | 226 |
| Tensile Modulus, TD (MPa) | 224 | 283 | 263 | 223 |
| Elmendorf Tear, MD (g/μm) | 4.3 | 11.2 | 7.3 | 4.2 |
| Elmendorf Tear, TD (g/μm) | 5.4 | 14.0 | 8.4 | 5.0 |
| Dart Drop Impact, Method A, Face (g/μm) | 4.4 | 6.1 | 6.4 | 4.0 |
| Shrinkage, MD[a] (%) | 55 | 54 | 58 | 54 |
| Shrinkage, TD[a] (%) | 44 | 37 | 45 | 44 |
| Total shrink (%) | 99 | 91 | 103 | 98 |
| Shrink ratio, MD/TD | 56/44 | 59/41 | 56/44 | 55/45 |
| Plastic Force, MD (cN/15 mm) | 6.6 | 1.4 | 3.2 | 8.4 |
| Plastic Force, TD (cN/15 mm) | 2.4 | 0 | 1.8 | 5.1 |
| Shrinkage, MD[b] (%) | 52 | 49 | 58 | 52 |
| Shrinkage, TD[b] (%) | 45 | 28 | 44 | 44 |

TABLE 7-continued

|  | 9 | 10 | 11 | 12C |
|---|---|---|---|---|
| Thermal Force, MD (N/15 mm) | 2.58 | 2.06 | 1.98 | 2.40 |
| Thermal Force, TD (N/15 mm) | 2.93 | 2.13 | 2.25 | 2.87 |
| Shrink Stress, MD (MPa) | 1.15 | 1.25 | 1.20 | 1.07 |
| Shrink Stress, TD (MPa) | 1.30 | 1.29 | 1.36 | 1.28 |

[a] Method (I)
[b] Method (II)

Examples 13-17C

Monolayer films were produced using resins as shown in Table 8. A comparative resin in Example 17C was used, the resin being a conventional 85/15 wt/wt blend of LDPE and LLDPE. The films were produced in a single bubble blown film process on an extruder with a die diameter of 350 mm; a die gap of 1.0 mm; a total output of 290-295 kg/hr; a blow-up ratio of 2.69, and a die temperature of 185-194° C. The frost line height was 900 mm, and the blown film draw ratios were 4.3, 4.36, 4.12, 4.12 and 4.37 for Examples 13-17C, respectively. The extruder was 120 mm in diameter and had an L/D ratio of 30. The temperature setting was 175-190° C. except for example 16, which was extruded at 165° C. The die temperature was 185-190° C. except sample 16, where it was 165° C. Melt pressure and temperature were 285-325 bar and 190-202° C., respectively, and internal bubble cooling was used. The extruder was equipped with a single lip air ring.

The results are shown in Table 8. The data show that the films of the invention have better optical properties and puncture resistance, and less tendency to hole formation (as shown by generally lower plastic force values) while maintaining equivalent shrinkage properties.

Examples 18-21

Multilayer films were produced using resins as shown in Table 9. The films were produced in a single bubble blown film coextrusion process with the same composition and thickness in each layer. The processing conditions are shown in Table 9, and the film results are shown in Table 10.

TABLE 9

|  | 18 | 19 | 20 | 21 |
|---|---|---|---|---|
| Die diameter (mm) | 350 | 350 | 350 | 350 |
| Die gap (mm) | 1 | 1 | 1 | 1 |
| Total output (kg/hr) | 261 | 227.8 | 261.7 | 261.6 |
| Blow-up ratio | 2.55 | 2.55 | 2.55 | 2.55 |
| Die temperature (° C.) |  | 200 |  | 200 |
| Blown film draw ratio | 5.45 | 5.35 | 5.44 | 5.44 |
| Frost line height (mm) | 800 | 800 | 800 | 800 |
| Extruder 1 |  |  |  |  |
| Diameter (mm) | 50 | 50 | 50 | 50 |
| L/D | 30 | 30 | 30 | 30 |
| Melt pressure (bar) |  |  |  |  |
| Melt temperature (° C.) | 195 | 190 | 190 | 190 |

TABLE 8

|  | 13 | 14 | 15 | 16 | 17C |
|---|---|---|---|---|---|
| Composition (wt %) | 85% LDPE-C 15% Resin A | 50% LDPE-C 50% Resin A | 25% LDPE-C 75% Resin A | 5% LDPE-C 95% Resin A | 85% LDPE-C 15% LLDPE-C |
| Thickness (μm) | 70 | 70 | 70 | 70 | 70 |
| Haze (%) | 10.7 | 10.1 | 11.6 | 14.2 | 11.8 |
| Clarity (%) | 51.6 | 51 | 45.3 | 43.6 | 18.4 |
| Gloss at 60° (%) | 8.2 | 9.5 | 9.6 | 9.1 | 8.0 |
| Tensile at Yield, MD (MPa) | 12.6 | 12.6 | 12.5 | 12.3 | 13.0 |
| Tensile at Yield, TD (MPa) | 12.8 | 12.6 | 12.8 | 12.6 | 14.2 |
| Tensile at Break, MD (MPa) | 27.1 | 35.4 | 41.2 | 46.4 | 26.4 |
| Tensile at Break, TD (MPa) | 25.9 | 31.1 | 36.3 | 40.7 | 25.3 |
| Elongation at Break, MD (%) | 511 | 587 | 607 | 613 | 521 |
| Elongation at Break, TD (%) | 678 | 681 | 691 | 674 | 675 |
| Energy to Break, MD (mJ/mm$^3$) | 89 | 113 | 121 | 126 | 92.7 |
| Energy to Break, TD (mJ/mm$^3$) | 99.2 | 109 | 118 | 121 | 102 |
| Tensile Modulus, MD (MPa) | 250 | 265 | 279 | 286 | 261 |
| Tensile Modulus, TD (MPa) | 274 | 282 | 306 | 301 | 312 |
| Puncture Resistance Damaging Energy (mJ/μm) | 38.3 | 95.2 | 137 | 167 | 39.3 |
| Puncture Resistance Damaging Force (N/μm) | 1.13 | 1.67 | 2.02 | 2.28 | 1.13 |
| Elmendorf Tear, MD (g/μm) | 5.3 | 4.37 | 7.6 | 8.12 | 3.5 |
| Elmendorf Tear, TD (g/μm) | 11.6 | 15.79 | 18.67 | 18 | 10.16 |
| Shrinkage, MD[a] (%) | 72 | 69 | 67 | 65 | 72 |
| Shrinkage, TD[a] (%) | 27 | 27 | 14 | 13 | 27 |
| Shrink ratio, MD/TD | 73/27 | 72/28 | 83/17 | 83/17 | 73/27 |
| Plastic Force, MD (cN/15 mm) | 5.4 | 3.5 | 0.8 | 0.34 | 5.1 |
| Shrinkage, MD[b] (%) | 61.5 | 54.4 | 48.8 | 42.6 | 56.9 |
| Shrinkage, TD[b] (%) | 5.5 | 7 | −1 | −1 | 4.8 |
| Thermal Force, MD (N/15 mm) | 1.49 | 1.42 | 1.48 | 1.53 | 1.57 |
| Thermal Force, TD (N/15 mm) | 1.25 | 1.36 | 1.40 | 1.32 | 1.35 |

[a] Method (I)
[b] Method (II)

TABLE 9-continued

|  | 18 | 19 | 20 | 21 |
|---|---|---|---|---|
| Output (kg/hr) | 26.3 |  | 26.2 | 26 |
| Screw speed (rpm) | 67.8 | 59.7 | 69.5 | 68 |
| Extruder 2 |  |  |  |  |
| Diameter (mm) | 120 | 120 | 120 | 120 |
| L/D | 30 | 30 | 30 | 30 |
| Melt temperature (° C.) | 201 | 201 | 202 | 201 |
| Output (kg/hr) | 209 | 179.7 | 209.3 | 209.6 |
| Screw speed (rpm) | 32.7 | 26.9 | 31.4 | 32.6 |
| Extruder 3 |  |  |  |  |
| Diameter (mm) | 50 | 50 | 50 | 50 |
| L/D | 30 | 30 | 30 | 30 |
| Melt temperature (° C.) | 189 | 190 | 190 | 190 |
| Output (kg/hr) | 26.1 | 25.7 |  | 25.8 |
| Screw speed (rpm) | 67.7 | 61.6 | 68.5 | 68.6 |

Examples 22-26C

Monolayer films were produced using resins as shown in Table 11. Comparative resins in Examples 25C and 26C were used, the resins being conventional 70/30 wt/wt blends of LDPE and two different LLDPEs. The films were produced in a single bubble blown film process on an extruder with a die diameter of 300 mm; a die gap of 1.2 mm in Examples 22-24 and 26C, and 2.7 mm in Example 25C; a total output of 141-180 kg/hr; a blow-up ratio of 2.2; and a die temperature of 204-213° C. The frost line height was 550 mm, and the blown film draw ratios were 10.7, 7.0, 9.4 and 9.4 for Examples 22-24 and 26C, respectively. The extruder was 70 mm in diameter and had an L/D ratio of 21. The extruder temperature setting was 195-205° C. Melt pressure and temperature were 131-167 bar and 207-222° C., respectively.

The results are shown in Table 11. The data show that the films of the invention have better optical properties and puncture resistance, and less tendency to hole formation (as shown by lower plastic force values) while maintaining equivalent shrinkage properties.

TABLE 10

|  | 18 | 19 | 20 | 21 |
|---|---|---|---|---|
| Composition (wt %) | 10% LDPE-D 90% Resin B | 20% LDPE-D 80% Resin B | 20% LDPE-D 80% Resin C | 10% LDPE-D 90% Resin C |
| Thickness[a] (μm) | 70 | 70 | 70 | 70 |
| Haze (%) | 12.4 | 11.9 | 10.9 | 12 |
| Clarity (%) | 73.1 | 73.7 | 75 | 74.1 |
| Gloss at 60° (%) | 9.9 | 9.7 | 9.9 | 9.5 |
| Tensile at Yield, MD (MPa) | 13.5 | 13.2 | 12.8 | 13.1 |
| Tensile at Yield, TD (MPa) | 13.9 | 13.7 | 13 | 13.6 |
| Tensile at Break, MD (MPa) | 44.1 | 40.8 | 42.1 | 46.9 |
| Tensile at Break, TD (MPa) | 42 | 40.4 | 43.1 | 44.5 |
| Elongation at Break, MD (%) | 648 | 625 | 568 | 615 |
| Elongation at Break, TD (%) | 693 | 700 | 672 | 683 |
| Energy to Break, MD (mJ/mm$^3$) | 135 | 128 | 122 | 138 |
| Energy to Break, TD (mJ/mm$^3$) | 133 | 132 | 128 | 134 |
| Tensile Modulus, MD (MPa) | 312 | 300 | 284 | 299 |
| Tensile Modulus, TD (MPa) | 325 | 320 | 297 | 322 |
| Dart Drop Impact, Method A, Face (g/μm) | 4.25 | 3.48 | 6.61 | 6.02 |
| Puncture Resistance Damaging Energy (mJ/μm) | 168 | 157 | 183 | 160 |
| Puncture Resistance Damaging Force (N/μm) | 2.24 | 2.19 | 2.56 | 2.34 |
| Elmendorf Tear, MD (g/μm) | 6.0 | 6.0 | 5.6 | 6.3 |
| Elmendorf Tear, TD (g/μm) | 16.4 | 17.1 | 18.5 | 18.3 |
| Shrinkage, MD[b] (%) | 66 | 68 | 72 | 70 |
| Shrinkage, TD[b] (%) | 22 | 24 | 26 | 24 |
| Total shrink (%) | 88 | 92 | 98 | 94 |
| Shrink ratio, MD/TD | 75/25 | 74/26 | 73/27 | 74/26 |
| Shrinkage, MD[c] (%) | 46.8 | 49.3 | 57.3 | 54.5 |
| Shrinkage, TD[c] (%) | 1.4 | 3.4 | 5.9 | 4.0 |
| Thermal Force, MD (N/15 mm) | 1.50 | 1.35 | 1.37 | 1.35 |
| Thermal Force, TD (N/15 mm) | 1.22 | 1.19 | 1.20 | 1.14 |
| Shrink Stress, MD (MPa) | 1.42 | 1.29 | 1.31 | 1.29 |

[a] total film thickness
[b] Method (I)
[c] Method (II)

TABLE 11

|  | 22 | 23 | 24 | 25C | 26C |
|---|---|---|---|---|---|
| Composition (wt %) | 70% LDPE-E 30% Resin B | 30% LDPE-E 70% Resin B | 10% LDPE-E 90% Resin B | 70% LDPE-E 30% LLDPE-D | 70% LDPE-E 30% LLDPE-E |
| Thickness (μm) | 50 | 50 | 50 | 50 | 50 |
| Haze (%) | 9.4 | 10.3 | 12.7 | 8.5 | 9.9 |
| Clarity (%) | 39.9 | 73.7 | 73.4 | 24.8 | 9.5 |
| Gloss at 60° (%) | 8.5 | 9.5 | 9.1 | 8.35 | 8.05 |
| Tensile at Yield, MD (MPa) | 13.1 | 12.9 | 13.2 | 12.6 | 12.3 |
| Tensile at Yield, TD (MPa) |  | 13.9 | 13.7 | 12 | 12.3 |
| Tensile at Break, MD (MPa) | 35.4 | 40.9 | 45.3 | 33.6 | 30.6 |
| Tensile at Break, TD (MPa) |  | 42.3 | 46.3 | 26.8 | 27.8 |
| Elongation at Break, MD (%) | 452 | 572 | 620 | 363 | 395 |
| Elongation at Break, TD (%) |  | 730 | 722 | 700 | 726 |
| Energy to Break, MD (mJ/mm$^3$) | 112 | 131 | 136 | 94.1 | 92.3 |
| Energy to Break, TD (mJ/mm$^3$) |  | 143 | 146 | 101 | 110 |
| Tensile Modulus, MD (MPa) | 253 | 281 | 293 | 238 | 236 |
| Tensile Modulus, TD (MPa) |  | 319 | 312 | 277 | 279 |
| Puncture Resistance Damaging Energy (mJ/μm) | 96 | 186 | 187 | 38.4 | 37.4 |
| Puncture Resistance Damaging Force (N/μm) | 1.88 | 2.59 | 2.57 | 1.41 | 1.32 |
| Shrinkage, MD$^{(a)}$ (%) | 80 | 77 | 73 | 82 | 81 |
| Shrinkage, TD$^{(a)}$ (%) | 20 | 16 | 14 | 10 | 13 |
| Shrink ratio, MD/TD | 80/20 | 83/17 | 84/16 | 89/11 | 86/14 |
| Plastic Force, MD (cN/15 mm) | 0.8 |  |  | 6.7 | 3.3 |
| Shrinkage, MD$^{(b)}$ (%) | 73 | 65.2 | 50 | 75.2 | 70.7 |
| Shrinkage, TD$^{(b)}$ (%) |  | −1 | −1 |  |  |
| Thermal Force, MD (N/15 mm) | 1.041 | 1.086 | 1.12 | 0.849 | 0.985 |
| Thermal Force, TD (N/15 mm) |  | 0.753 | 0.897 |  |  |

$^{(a)}$Method (I)
$^{(b)}$Method (II)

Examples 27-31C

Monolayer films were produced using unblended resins as shown in Table 12, to form 50 μm films. Comparative resins in Examples 30C and 31C were used, the resins being conventional LDPEs. The films were produced in a single bubble blown film process on an extruder with a diameter of 60 mm and L/D ratio of 28; a die diameter of 200 mm; a die gap of 1.0 mm; a total output of abut 75 kg/hr; and a blow-up ratio of 2.5. The frost line height was 500 mm. The temperature setting on the extruder and die was 170° C. for all samples except sample 35C, where the setting was 190° C. The results are shown in Table 12.

TABLE 12

|  | 27 | 28 | 29 | 30C | 31C |
|---|---|---|---|---|---|
| Composition | Resin D | Resin A | Resin C | LDPE-F | LDPE-G |
| Thickness (μm) | 50 | 50 | 50 | 50 | 50 |
| Haze (%) | 11.0 | 10.4 | 10.4 | 7.5 | 6.2 |
| Clarity (%) | 67 | 69 | 74 | 41 | 64 |
| Gloss at 60° (%) | 10.9 | 10.6 | 10.2 | 9.3 | 9.7 |
| Tensile at Yield, MD (MPa) | 11.4 | 11.9 | 12.9 | 13.1 | 12.2 |
| Tensile at Yield, TD (MPa) | 11.2 | 11.9 | 13.6 | 12.3 | 12.8 |
| Tensile at Break, MD (MPa) | 47.3 | 52.6 | 47.1 | 28.4 | 32.3 |
| Tensile at Break, TD (MPa) | 43.4 | 51.9 | 49.1 | 25.6 | 23.8 |
| Elongation at Break, MD (%) | 654 | 628 | 584 | 353 | 307 |
| Elongation at Break, TD (%) | 687 | 673 | 668 | 588 | 568 |
| Energy to Break, MD (mJ/mm$^3$) | 134 | 142 | 128 | 77.2 | 78.1 |
| Energy to Break, TD (mJ/mm$^3$) | 126 | 139 | 137 | 87.6 | 80.3 |
| Tensile Modulus, MD (MPa) | 247 | 265 | 297 | 249 | 256 |
| Tensile Modulus, TD (MPa) | 250 | 268 | 316 | 268 | 309 |
| Puncture Resistance Damaging Energy (mJ/μm) | 175 | 237 | 189 | 99.1 | 58 |
| Puncture Resistance Damaging Force (N/μm) | 2.37 | 3.12 | 2.67 | 1.95 | 1.77 |
| Dart Drop Impact, Method A, Face (g/μm) | 5.9 | 10 | 6.74 | 3 | 2.7 |
| Elmendorf Tear, MD (g/μm) | 10.3 | 9.4 | 6.8 | 4.2 | 7.7 |
| Elmendorf Tear, TD (g/μm) | 16.9 | 17.8 | 18.6 | 3.8 | 3.2 |
| Shrinkage, MD$^{(a)}$ (%) | 57 | 72 | 69 | 77 | 84 |
| Shrinkage, TD$^{(a)}$ (%) | 3 | 8 | 15 | 33 | 31 |
| Total Shrink (%) | 60 | 80 | 84 | 110 | 115 |
| Shrink ratio, MD/TD | 95/5 | 90/10 | 82/18 | 70/30 | 73/27 |
| Plastic Force, MD (cN/15 mm) | 1.3 | 1.2 | 2.3 |  |  |
| Plastic Force, TD (cN/15 mm) | 0 | 0 | 0 |  |  |

TABLE 12-continued

|  | 27 | 28 | 29 | 30C | 31C |
|---|---|---|---|---|---|
| Thermal Force, MD (N/15 mm) | 0.859 | 1.038 | 1.25 | | |
| Thermal Force, TD (N/15 mm) | 0.689 | 0.934 | 1.035 | | |
| Shrink Stress, MD (MPa) | 1.15 | 1.38 | 1.67 | | |
| Shrink Stress, TD (Mpa) | 0.92 | 1.25 | 1.38 | | |

(a)Method (I)

Examples 32-35C

Monolayer films were produced using unblended resins as shown in Table 13, to form 25 μm films. A comparative resins in Example 35C were used, the resins being a conventional LDPE. The films were produced as described in Examples 27-31C, and the results are shown in Table 13.

TABLE 13

|  | 32 | 33 | 34 | 35C |
|---|---|---|---|---|
| Composition | Resin D | Resin A | Resin C | LDPE-G |
| Thickness (μm) | 25 | 25 | 25 | 25 |
| Haze (%) | 11.2 | 10.1 | 11.6 | 5.4 |
| Clarity (%) | 73 | 75 | 75 | 68 |
| Gloss at 60° (%) | 10.5 | 10.1 | 8.9 | 10.2 |
| Tensile at Yield, MD (Mpa) | 11 | 11.7 | 13 | 12.1 |
| Tensile at Yield, TD (MPa) | 12 | 13.2 | 14.4 | 11.6 |
| Tensile at Break, MD (MPa) | 54 | 64.2 | 59.8 | 20.3 |
| Tensile at Break, TD (Mpa) | 52 | 52 | 56.5 | 22.4 |
| Elongation at Break, MD (%) | 594 | 554 | 503 | 314 |
| Elongation at Break, TD (%) | 665 | 623 | 651 | 582 |
| Energy to Break, MD (mJ/mm$^3$) | 138 | 152 | 140 | 74.2 |
| Energy to Break, TD (mJ/mm$^3$) | 140 | 131 | 147 | 77.6 |
| Tensile Modulus, MD (MPa) | 222 | 246 | 297 | 221 |
| Tensile Modulus, TD (Mpa) | 252 | 283 | 338 | 245 |
| Puncture Resistance Damaging Energy (mJ/μm) | 208 | 238 | 201 | 45.8 |
| Puncture Resistance Damaging Force (N/μm) | 2.92 | 3.48 | 3.11 | 1.58 |
| Dart Drop Impact, Method A, Face (g/μm) | 8.3 | 22.9 | 9.92 | 2.58 |
| Elmendorf Tear, MD (g/μm) | 8.9 | 8.7 | 4.8 | 6.3 |
| Elmendorf Tear, TD (g/μm) | 19.6 | 20.1 | 20.6 | 3.8 |
| Shrinkage, MD(a) (%) | 71 | 73 | 78 | 82 |
| Shrinkage, TD(a) (%) | 19 | 24 | 23 | 27 |
| Total Shrink (%) | 90 | 97 | 101 | 109 |
| Shrink ratio, MD/TD | 79/21 | 75/25 | 77/23 | 75/25 |

(a)Method (I)

Examples 36-37

Monolayer films were produced using unblended resins as shown in Table 14, to form 15 μm films. The films were produced as described in Examples 27-31C, and the results are shown in Table 14.

TABLE 14

|  | 36 | 37 |
|---|---|---|
| Composition | Resin D | Resin A |
| Thickness (μm) | 15 | 15 |
| Haze (%) | 12.3 | 11.1 |
| Clarity (%) | 73 | 73 |
| Gloss at 60° (%) | 9.5 | 9.0 |
| Tensile at Yield, MD (MPa) | 10.8 | 11.9 |
| Tensile at Yield, TD (MPa) | 10.9 | 10.9 |
| Tensile at Break, MD (MPa) | 54.5 | 68.6 |
| Tensile at Break, TD (MPa) | 49.2 | 55.1 |
| Elongation at Break, MD (%) | 532 | 468 |
| Elongation at Break, TD (%) | 663 | 656 |
| Energy to Break, MD (mJ/mm$^3$) | 128 | 143 |
| Energy to Break, TD (mJ/mm$^3$) | 129 | 137 |
| Tensile Modulus, MD (MPa) | 213 | 251 |
| Tensile Modulus, TD (MPa) | 239 | 252 |
| Puncture Resistance Damaging Energy (mJ/μm) | 244 | 247 |
| Puncture Resistance Damaging Force (N/μm) | 3.55 | 3.87 |
| Dart Drop Impact, Method A, Face (g/μm) | 14.4 | 34.5 |
| Elmendorf Tear, MD (g/μm) | 6.7 | 6.2 |
| Elmendorf Tear, TD (g/μm) | 20.1 | 24.3 |
| Shrinkage, MD(a) (%) | 78 | 68 |
| Shrinkage, TD(a) (%) | 17 | 22 |
| Total Shrink (%) | 95 | 90 |
| Shrink ratio, MD/TD | 82/18 | 76/24 |

(a)Method (I)

All patents, test procedures, and other documents cited herein, including priority documents, are fully incorporated by reference to the extent such disclosure is not inconsistent with this invention and for all jurisdictions in which such incorporation is permitted.

Having thus described the invention in detail with particular reference to examples and various embodiments, without intending to limit the invention, the following are the preferred embodiments: A heat-shrinkable monolayer film comprising a polymer blend comprising: (a) a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5; and (b) a low density polyethylene (LDPE), wherein the film has a clarity value of at least 10% and a puncture resistance damaging energy value of at least 40 mJ/μm; or the aforementioned and also the following more preferred embodiments, alone or in combination with other more preferred embodiments as would be apparent to one of skill in the art in possession of the present disclosure: wherein the clarity value is at least 15%; wherein the clarity value is at least 20%; wherein the puncture resistance damaging energy value is at least 65 mJ/μm; wherein the puncture resistance damaging energy value is at least 90 mJ/μm; wherein the film has a machine direction plastic force of less than 7 cN/15 mm; wherein the film has a machine direction shrink stress of at least 1.10 MPa; wherein the film has an averaged shrink stress of at least 1.18 MPa, wherein the averaged shrink stress is the arithmetic mean of machine direction and transverse direction shrink stress values; wherein component (a) is present in the blend in an amount of at least 5 by weight, based on the total weight of component (a) and component (b); wherein component (a) is present in the blend in an amount of at least 15 by weight, based on the total weight of component (a) and component (b); wherein component (a) is present in the blend in an amount of at least 30 by weight, based on the total weight of component (a) and component (b); wherein the blend further comprises a high density polyethylene (HDPE) in an amount of from 0.5% to 20% by weight, based on the total weight of component (a) and component (b); wherein the blend further comprises a high density polyethylene (HDPE) in an amount of from 2% to 15% by weight, based on the total weight of component (a) and component (b); wherein the film has a thickness of from 10 to 500 μm; wherein the film has a thickness of from 15 to 80 μm; wherein the film has a thickness of from 80 to 200 μm; and a preferred embodiment of a heat-shrinkable multilayer film comprising at least one layer comprising a polymer blend, the blend comprising: (a) a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5; and (b) a low density polyethylene (LDPE), wherein the film has a clarity value of at least 20% and a puncture resistance damaging energy value of at least 100 mJ/μm; or the aforementioned and also the following more preferred embodiments, alone or in combination with other more preferred embodiments as would be apparent to one of skill in the art in possession of the present disclosure: wherein the clarity value is at least 50%; wherein the clarity value is at least 70%; wherein the film has a puncture resistance damaging energy value of at least 100 mJ/μm; wherein the film has a puncture resistance damaging energy value of at least 125 mJ/μm; wherein the film has a puncture resistance damaging energy value of at least 150 mJ/μm; wherein the film has a machine direction thermal force value of at least 1.25 N/15 mm; wherein the film has a machine direction thermal force value of at least 1.30 N/15 mm; wherein the film has a machine direction shrink stress value of at least 1.20 MPa; wherein the film has a machine direction shrink stress value of at least 1.25 MPa; wherein component (a) is present in the blend in an amount of at least 10% by weight, based on the total weight of component (a) and component (b); wherein component (a) is present in the blend in an amount of at least 30% by weight, based on the total weight of component (a) and component (b); wherein component (a) is present in the blend in an amount of at least 50% by weight, based on the total weight of component (a) and component (b); wherein component (a) is present in the blend in an amount of at least 70% by weight, based on the total weight of component (a) and component (b); wherein the blend further comprises a high density polyethylene (HDPE) in an amount of from 0.5% to 20% by weight, based on the total weight of component (a) and component (b); wherein the blend further comprises a high density polyethylene (HDPE) in an amount of from 2% to 15% by weight, based on the total weight of component (a) and component (b); wherein the film has a thickness of from 10 to 500 μm; wherein the film has a thickness of from 15 to 80 μm; wherein the film has a thickness of from 80 to 200 μm; or any of the aforementioned preferred or more preferred embodiments wherein: the CDBI is at least 75%; wherein the CDBI is at least 85%; wherein the melt index is from 0.3 to 10 g/10 min; wherein the density is from 0.916 to 0.940 g/cm$^3$; wherein the density is from 0.918 to 0.935 g/cm$^3$; wherein the melt index ratio is from 35 to 60; wherein the Mw/Mn ratio is from 2.8 to 4.5; wherein the Mw/Mn ratio is from 3.0 to 4.0; and also a preferred embodiment that is an article wrapped with the film of any of the aforementioned preferred or more preferred embodiments; and also a preferred embodiment which is a method of shrink-wrapping an article, comprising (a) providing an article; (b) providing the film of any of the aforementioned preferred or more preferred embodiments; (c) wrapping the article with the film; and (d) applying heat to shrink the film; and also a preferred embodiment which is a polymer blend comprising: (a) a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5; and (b) a low density polyethylene (LDPE), wherein component (a) is present in the blend in an amount of at least 5% by weight, based on the total weight of component (a) and component (b); or the aforementioned and also the following more preferred embodiments, alone or in combination with other more preferred embodiments as would be apparent to one of skill in the art in possession of the present disclosure: wherein component (a) is present in the blend in an amount of at least 20% by weight, based on the total weight of component (a) and component (b); wherein component (a) is present in the blend in an amount of at least 50% by weight, based on the total weight of component (a) and component (b); the blend further comprising a high density polyethylene (HDPE) in an amount of from 0.5% to 20% by weight, based on the total weight of component (a) and component (b); and the blend further comprising a high density polyethylene (HDPE) in an amount of from 2% to 15% by weight, based on the total weight of component (a) and component (b).

What is claimed is:

1. A heat-shrinkable monolayer film comprising a polymer blend comprising:
   (a) a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5; and
   (b) a low density polyethylene (LDPE) having a melt index $I_{2.16}$ of from 0.05 to 10 g/10 min and a density of from 0.920 to 0.940 g/cm$^3$,
   wherein the film has a clarity value of at least 10%; and a puncture resistance damaging energy value of at least 140 mJ/μm; a machine direction plastic force of less than 7 cN/15 mm, and a machine direction shrink stress of at least 1.10 mPa.

2. The film of claim 1, wherein the clarity value is at least 15%.

3. The film of claim 1, wherein the clarity value is at least 20%.

4. The film of claim 1, wherein the puncture resistance damaging energy value is at least 150 mJ/μm.

5. The film of claim 1, wherein the film has an averaged shrink stress of at least 1.18 MPa, wherein the averaged shrink stress is the arithmetic mean of machine direction and transverse direction shrink stress values.

6. The film of claim 1, wherein component (a) is present in the blend in an amount of at least 5 by weight, based on the total weight of component (a) and component (b).

7. The film of claim 1, wherein component (a) is present in the blend in an amount of at least 15 by weight, based on the total weight of component (a) and component (b).

8. The film of claim 1, wherein component (a) is present in the blend in an amount of at least 30 by weight, based on the total weight of component (a) and component (b).

9. The film of claim 1, wherein the blend further comprises a high density polyethylene (HDPE) in an amount of from 0.5% to 20% by weight, based on the total weight of component (a) and component (b).

10. The film of claim 1, wherein the blend further comprises a high density polyethylene (HDPE) in an amount of from 2% to 15% by weight, based on the total weight of component (a) and component (b).

11. The film of claim 1, wherein the film has a thickness of from 10 to 500 μm.

12. The film of claim 1, wherein the film has a thickness of from 15 to 80 μm.

13. The film of claim 1, wherein the film has a thickness of from 80 to 200 μm.

14. A heat-shrinkable multilayer film comprising at least one layer comprising a polymer blend, the blend comprising:
   (a) a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5; and
   (b) a low density polyethylene (LDPE) having a melt index $I_{2.16}$ of from 0.05 to 10 g/10 min. a density of from 0.920 to 0.940 g/cm$^3$,
   wherein the film has a clarity value of at least 20%; a puncture resistance damaging energy value of at least 125 mJ/μm; a machine direction thermal force of at least 1.25 N/15 mm; and a machine direction shrink stress value of at least 1.20 MPa.

15. The film of claim 14, wherein the clarity value is at least 50%.

16. The film of claim 14, wherein the clarity value is at least 70%.

17. The film of claim 14, wherein the film has a puncture resistance damaging energy value of at least 140 mJ/μm.

18. The film of claim 14, wherein the film has a puncture resistance damaging energy value of at least 150 mJ/μm.

19. The film of claim 14, wherein the film has a machine direction thermal force value of at least 1.30 N/15 mm.

20. The film of claim 14, wherein the film has a machine direction shrink stress value of at least 1.25 MPa.

21. The film of claim 14, wherein component (a) is present in the blend in an amount of at least 10% by weight, based on the total weight of component (a) and component (b).

22. The film of claim 14, wherein component (a) is present in the blend in an amount of at least 30% by weight, based on the total weight of component (a) and component (b).

23. The film of claim 14, wherein component (a) is present in the blend in an amount of at least 50% by weight, based on the total weight of component (a) and component (b).

24. The film of claim 14, wherein component (a) is present in the blend in an amount of at least 70% by weight, based on the total weight of component (a) and component (b).

25. The film of claim 14, wherein the blend further comprises a high density polyethylene (HDPE) in an amount of from 0.5% to 20% by weight, based on the total weight of component (a) and component (b).

26. The film of claim 14, wherein the blend further comprises a high density polyethylene (HDPE) in an amount of from 2% to 15% by weight, based on the total weight of component (a) and component (b).

27. The film of claim 14, wherein the film has a thickness of from 10 to 500 μm.

28. The film of claim 14, wherein the film has a thickness of from 15 to 80 μm.

29. The film of claim 14, wherein the film has a thickness of from 80 to 200 μm.

30. The film of claim 1, wherein the CDBI of the polyethylene copolymer is at least 75%.

31. The film of claim 1, wherein the CDBI of the polyethylene copolymer is at least 85%.

32. The film of claim 1, wherein the melt index is from 0.3 to 10 g/10 min.

33. The film of claim 1, wherein the density of the polyethylene copolymer is from 0.916 to 0.940 g/cm$^3$.

34. The film of claim 1, wherein the density of the polyethylene copolymer is from 0.918 to 0.935 g/cm$^3$.

35. The film of claim 1, wherein the melt index ratio is from 35 to 60.

36. The film of claim 1, wherein the Mw/Mn ratio is from 2.8 to 4.5.

37. The film of claim 1, wherein the Mw/Mn ratio is from 3.0 to 4.0.

38. An article wrapped with the film of claims 1.

39. A method of shrink-wrapping an article, comprising
   (a) providing an article;
   (b) providing the film of claim 1;
   (c) wrapping the article with the film; and
   (d) applying heat to shrink the film.

40. The film of claim 14, wherein the CDBI is at least 75%.

41. The film of claim 14, wherein the CDBI is at least 85%.

42. The film of claim 14, wherein the melt index is from 0.3 to 10 g/10 min.

43. The film of claim 14, wherein the density of the polyethylene copolymer is from 0.916 to 0.940 g/cm$^3$.

44. The film of claim 14, wherein the density of the polyethylene copolymer is from 0.918 to 0.935 g/cm$^3$.

45. The film of claim 14, wherein the melt index ratio is from 35 to 60.

46. The film of claim 14, wherein the Mw/Mn ratio is from 2.8 to 4.5.

47. The film of claim 14, wherein the Mw/Mn ratio is from 3.0 to 4.0.

48. An article wrapped with the film of claim 14.

49. A method of shrink-wrapping an article, comprising (a) providing an article; (b) providing the film of claim 14; (c) wrapping the article with the film; and (d) applying heat to shrink the film.

50. The film of claim 1, wherein the CDBI of the polyethylene copolymer is at least 80%.

51. The film of claim 14, wherein the CDBI of the polyethylene copolymer is at least 80%.

52. The film of claim 1, wherein component (a) is present in the blend in an amount of at least 50 by weight, based on the total weight of component (a) and component (b).

53. The film of claim 14, wherein component (a) is present in the blend in an amount of at least 50 by weight, based on the total weight of component (a) and component (b).

* * * * *